United States Patent [19]

Kim et al.

[11] Patent Number: 4,770,535
[45] Date of Patent: * Sep. 13, 1988

[54] DISTRIBUTED SENSOR ARRAY AND METHOD USING A PULSED SIGNAL SOURCE

[75] Inventors: Byoung Y. Kim, Menlo Park, Calif.; Moshe Tur, Tel Aviv, Israel; Janet L. Brooks, Stanford, Calif.; Kenneth A. Fesler, Sunnyvale, Calif.; Herbert J. Shaw, Stanford, Calif.

[73] Assignee: The Board of Trustees of the Leland Stanford Junior University, Stanford, Calif.

[ * ] Notice: The portion of the term of this patent subsequent to Oct. 6, 2002 has been disclaimed.

[21] Appl. No.: 877,296

[22] Filed: Jun. 23, 1986

Related U.S. Application Data

[63] Continuation-in-part of Ser. No. 699,855, Feb. 8, 1985, Pat. No. 4,697,926, and a continuation-in-part of Ser. No. 738,678, May 28, 1985, Pat. No. 4,699,513.

[51] Int. Cl.$^4$ ................................................. G01B 9/02
[52] U.S. Cl. ..................................... 356/345; 250/227
[58] Field of Search ......................... 356/345; 250/227

[56] References Cited

U.S. PATENT DOCUMENTS

| | | |
|---|---|---|
| 4,299,490 | 11/1981 | Cahill et al. |
| 4,334,781 | 6/1982 | Ozeki |
| 4,372,685 | 2/1983 | Ulrich |
| 4,375,680 | 3/1983 | Cahill et al. |
| 4,432,599 | 2/1984 | McMahon |
| 4,443,700 | 4/1984 | Macedo et al. |
| 4,517,456 | 5/1985 | Halsall et al. ................... 250/227 X |
| 4,545,253 | 10/1985 | Avicola ............................ 250/227 X |
| 4,572,949 | 2/1986 | Bowers et al. |
| 4,632,551 | 12/1986 | Pavlath ............................... 356/345 |
| 4,653,916 | 3/1987 | Henning et al. ..................... 356/345 |
| 4,697,926 | 10/1987 | Youngquist et al. |
| 4,699,513 | 10/1987 | Brooks et al. |

FOREIGN PATENT DOCUMENTS 3044183 6/1982 Fed. Rep. of Germany.
2106736 4/1983 United Kingdom.

OTHER PUBLICATIONS

John P. Palmer, et al., "Analog Matrix Multiplication by Directional Coupling Between Optical Fibers," SPIE, vol. 232, International Optical Computing Conference, 1980, pp. 157-159.

R. Ulrich, "Fiber-Optic Rotation Sensing with Low Drift," *Optics Letters*, vol. 5, No. 5, May 1980, pp. 173-175.

(List continued on next page.)

*Primary Examiner*—Davis L. Willis
*Assistant Examiner*—Matthew W. Koren
*Attorney, Agent, or Firm*—Knobbe, Martens, Olson & Bear

[57] ABSTRACT

A distributed sensor system using pulsed optical signals optionally produced by a short coherence length source to provide a phase difference output signal representative of conditions affecting a selected sensor. In one preferred embodiment, an array of fiber-optic sensors are organized in a ladder configuration, with the sensors positioned in spaced relation and defining the rungs of the ladder. Light pulses transmitted through the sensors are multiplexed onto a return arm of the ladder. The multiplexed signals are received by an optical fiber compensating interferometer which coherently couples portions of adjacent multiplexed light signals to produce a phase difference signal representing conditions influencing selected sensors. In other preferred embodiments, the system is configured to define a plurality of adjacent Mach-Zehnder interferometers which provide output signal pairs which coherently couple to yield a phase difference signal directly representing the environmental effects on a particular sensor. Functional equivalents of the Mach-Zehnder interferometer configurations comprise configurations including adjacent Michelson interferometers. A phase and amplitude modulation technique is disclosed for providing heterodyned output signals from the distributed sensor system.

28 Claims, 7 Drawing Sheets

OTHER PUBLICATIONS

A. R. Nelson et al., "Passive Multiplexing Techniques for Fiber-Optic Sensor Systems," I.F.O.C., Mar. 1981, p. 27.

R. A. Bergh, et al., "All-Single-Mode Fiber-Optic Gyroscope," *Optics Letters*, vol. 6, No. 4, Apr. 1981, pp. 198-200.

R. A. Bergh, et al., "All-Single-Mode Fiber-Optic Gyroscope with Long-Term Stability," *Optics Letters*, vol. 6, No. 10, Oct. 1981, pp. 502-504.

H. C. Lefevre, et al., "All-Fiber Gyroscope with Inertial-Navigation Short-Term Sensitivity," *Optics Letters*, vol. 7, No. 9, Sep. 1982, pp. 454-456.

J. E. Bowers, et al., "Fiber-Optic Variable Delay Lines," *Electronics Letters*, vol. 18, No. 23, Nov. 11, 1982, pp. 999-1000.

D. Uttam, et al., "Remote Interferometric Sensors Using Frequency Modulated Laser Sources," *First International Conference on Optical Fiber Sensors*, London, Apr. 26-28, 1983, pp. 182-184.

M. L. Henning, et al., "Optic Fiber Hydrophones with Down Lead Insensitivity," Proceedings of the First International Conference on Optical Fiber Sensors, London, 1983, pp. 23-27.

I. P. Giles et al., "Coherent Optical-Fiber Sensors with Modulated Laser Sources," *Electronics Letters*, vol. 19, No. 1, Jan. 6, 1983, pp. 14-15.

S. A. Al-Chalabi, et al., "Partially Coherent Sources in Interferometric Sensors," IEEE, *Proceedings of the First International Conference on Optical Fiber Sensors*, Apr. 1983, pp. 132-135.

B. Y. Kim, et al., "Response of Fiber Gyros to Signals Introduced at the Second Harmonic of the Bias Modulation Frequency," SPIE, Conference Proceedings Held in San Diego, Calif., vol. 425, Aug. 1983, pp. 86-89.

R. C. Youngquist, et al., "Birefringent-Fiber Polarization Coupler," *Optics Letters*, vol. 8, No. 12. Dec. 1983, pp. 656-658.

P. Jaccard, et al., "A New Technique for Low Cost All-Fiber Device Fabrication," *SPIE'S Technical Symposium East*, 1984.

J. P. Goedgebuer, et al., "Multiplex Communication Via Electro-Optic Phase Modulation of White Light," Taylor Francis Ltd., vol. 29, No. 4, 1984, pp. 471-477.

B. Y. Kim, et al., "All-Fiber-Optic Gyroscope with Linear Scale Factor Using Phase Detection," *SPIE*, vol. 478, Fiber Optic and Laser Sensors II, 1984, pp. 142-148.

B. Y. Kim, et al., "Phase-Reading All-Fiber-Optic Gyroscope *Optics Letters*, vol. 9, No. 8, Aug. 1984, pp. 378-380.

Th. Bosselmann, et al., "High Accuracy Positioning Sensing with Fiber-Coupled White-Light Interferometers," *Second International Conference on Optical Fiber Sensors*, Stuttgart, Sep. 5-7, 1984, pp. 361-364.

A. J. Rogers, "Polarization-Optical Time Domain Reflectometry: A Technique for the Measurement of Field Distributions," *Applied Optics*, vol. 20, No. 6, Mar. 15, 1981, pp. 1060-1074.

J. E. Bowers, "Fiber-Optical Sensor for Surface Acoustic Waves," *Applied Physics Letters*, vol. 41, No. 3, Aug. 1, 1982, pp. 231-233.

J. P. Dakin, et al., "Novel Optical Fiber Hydrophone Array Using a Single Laser Source and Detector," *Electronics Letters*, vol. 20, No. 1, Jan. 5, 1984, pp. 53-54.

S. W. Thornton, "Experimental Performance of an Optical Hydrophone with Downlead Sensitivity," *Second International OFS Conference*, Stuttgart, Sep. 5-7, 1984, pp. 369-373.

J. P. Dakin, et al., "Optical Fiber Hydrophone Array-Recent Progres," *Second International OFS Conference*, Stuttgart, Sep. 5-7, 1984, pp. 375-379.

E. L. Geeen, et al., "Remote Passive Phase Sensor," OFS, 1985, pp. 1-4.

Stuart A. Kingsley, et al., "OFDR Diagnostics for Fiber/Integrated Optic Systems and High Resolution Ditributed Fiber Optic Sensing," SPIE, vol. 566, Fiber Optic and Laser Sensors III, pp. 265-275, 1985.

J. L. Brooks, et al., "Fiber-Optic Interferometric Sensor Arrays with Freedom from Source Phase-Induced Noise," *Optics Letters*, vol. 11, No. 7, Jul. 1986, pp. 473-475.

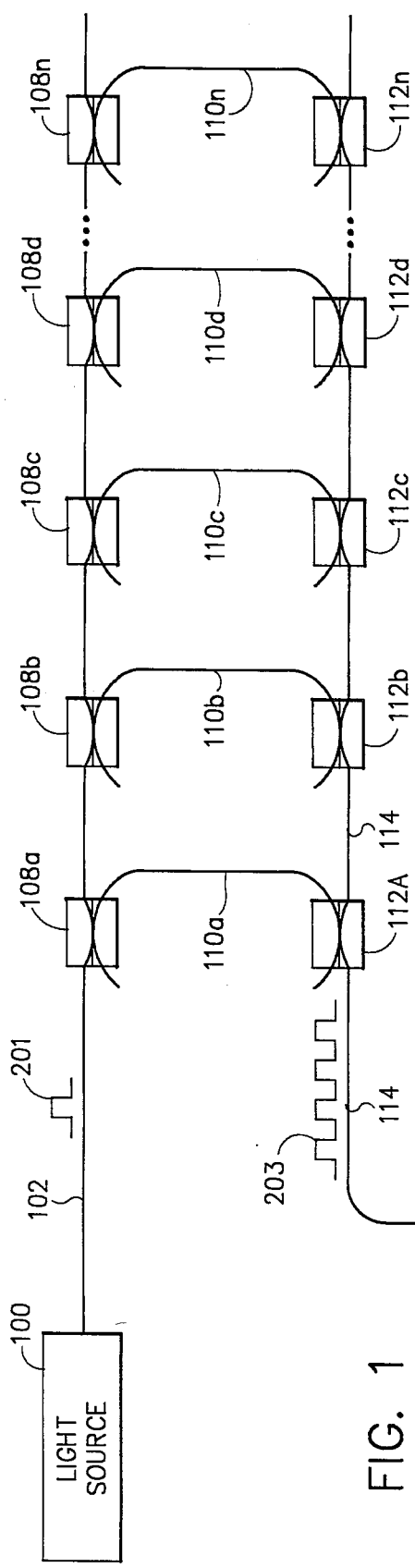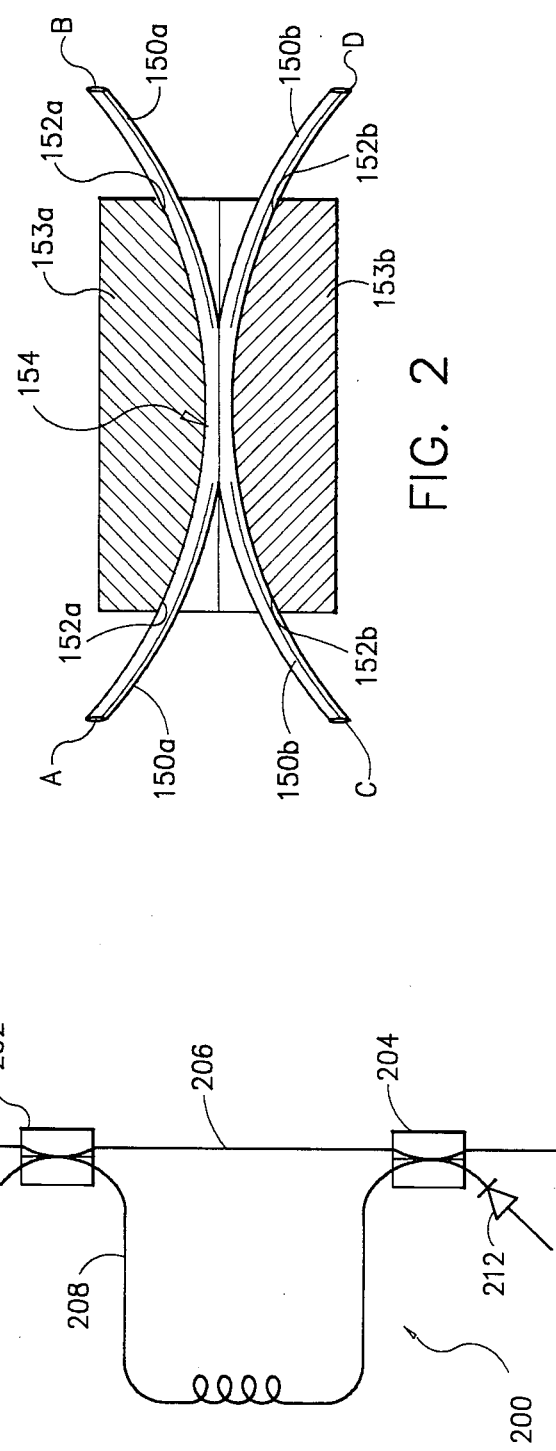
FIG. 1
FIG. 2

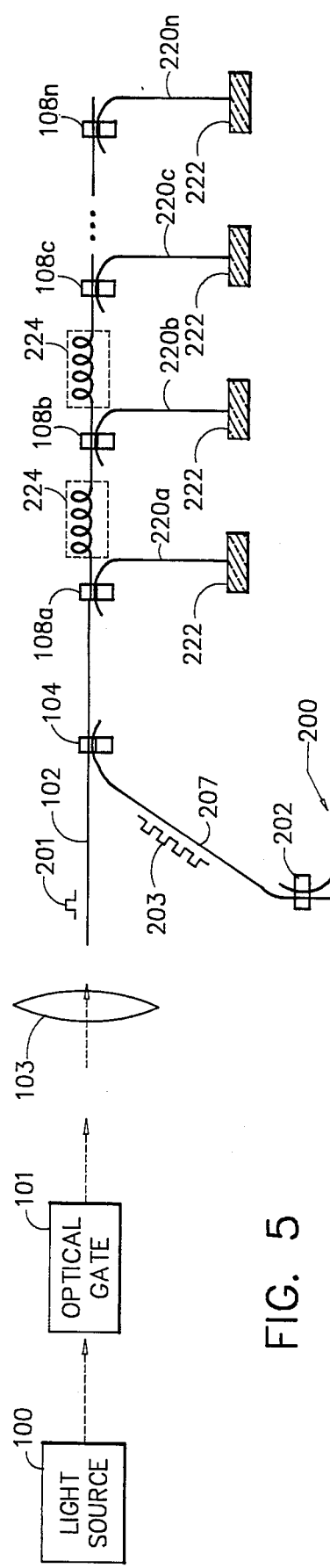
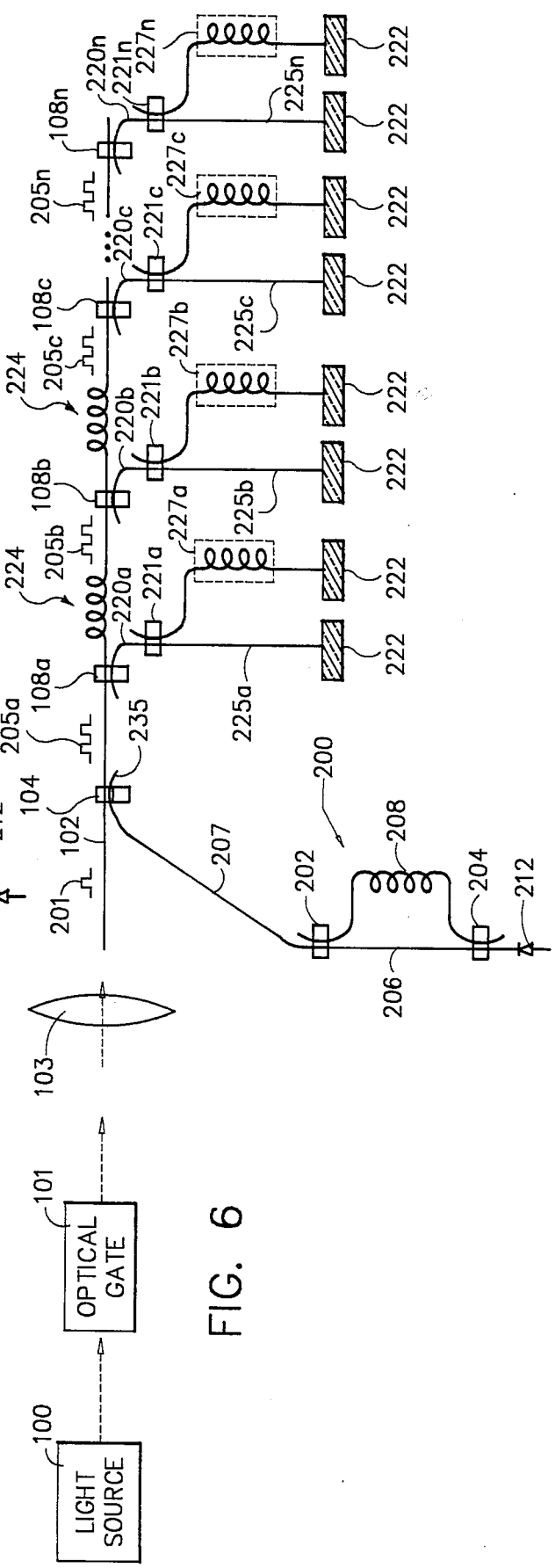
FIG. 5
FIG. 6

DISTRIBUTED SENSOR ARRAY AND METHOD USING A PULSED SIGNAL SOURCE

RELATED APPLICATIONS

This is a continuation-in-part of parent patent application Ser. No. 699,855 filed Feb. 8, 1985, inventors Robert C. Youngquist et al, and entitled "Coherent Distributed Sensor and Method Using Short Coherence Length Sources," now U.S. Pat. No. 4,697,926, issued on Oct. 6, 1987.

This is also a continuation-in-part of parent patent application Ser. No. 738,678 filed May 28, 1985, inventors Janet L. Brooks et al., and entitled "Distributed Sensor and Method Using Coherence Multiplexing of Fiber-Optic Interferometric Sensors," now U.S. Pat. No. 4,699,513, issued on Oct. 13, 1987.

Both of the above patent applications are hereby incorporated herein by reference.

BACKGROUND OF THE INVENTION

The present invention relates to fiber-optic sensors, and particularly to distributed fiber-optic sensor arrays which utilize time division multiplexing in their operation.

Over the past few years, fiber-optic devices have been actively studied and developed for use in various sensing applications in a wide range of fields. One reason for this interest is the sensitivity of optical fibers to environmental conditions which surround them. For example, factors such as temperature, pressure, and acoustical waves directly affect the light transmitting characteristics of optical fiber. These changes in the optical fiber produce a change in the phase of light signals traveling in the fiber. Thus, a measurement of the change in phase of optical signals which have been transmitted through that fiber is representative of changes in those environmental conditions which have affected the fiber.

Recently, particular efforts have been directed to the development of systems having sensors organized in arrays, so that a number of sensors can utilize light from a single source, and provide environmental information at a common detection location. Ideally, such an array would consist of a fiber input bus which would carry light to a set of sensors. Each sensor would imprint information about the environment to this optical carrier. An output fiber bus would then collect this information and bring it back to a central processing location, where information obtained from any selected one of the sensors could be readily identified and analyzed.

The goal of these development efforts is to produce sensor arrays which could be used for specific applications such as monitoring rapidly changing environmental conditions. For example, such sensor arrays could be used to detect acoustic waves in order to determine the source location and acoustical characteristics of those waves. For many such applications, it may be necessary to space the arrays over a relatively large area. In these situations, the replacement of electrical lines by fiber optics, for example, would overcome problems such as electrical pickup, cable weight, and safety hazards associated with the use of those electrical lines. Even when the sensor is used in limited space, the removal of electronics and bulk optics components generally should provide improved system performance due to reduced noise. On the other hand, replacement of long electrical lines by optical fibers creates a problem in preventing or removing any influence of environmental conditions on the non-sensor portions of the system. This, therefore, becomes an important design consideration.

Of course, the primary design consideration in developing a sensor array is the method by which information from each sensor can be separated for individual identification from among all of the information arriving at the central processing location on the single data stream. Distributed sensing systems developed previously have generally applied one of two approaches for separating information of an individual sensor from a single data stream.

One approach which has been used for separating each sensor's information from the single data stream has been to frequency-division multiplex the sensor outputs, in the manner described by I. P. Giles, D. Uttam, B. Culshaw, and D. E. N. Davies, "Coherent Optical-Fibre Sensors With Modulated Laser Sources," *Electronics Letters*, Vol. 19, Page 14, (1983). This approach is accomplished by frequency ramping the optical source and arranging the array geometry so that the transit time of the light from the source to a sensor and back to the central location is unique for each sensor. In this case, the array output is mixed with the sources's present output, thereby producing a unique central frequency for each sensor. The environmental information is carried in the sidebands about this central frequency.

One particular problem with the above-described system involves the "fly back" period when the periodic ramp signal is reset from its maximum to its minimum position. This fly back period comprises a time when system operation may not occur, since no ramp signal is present, and no meaningful results would be produced. This places some limit on the rate at which environmental conditions may change and still be reliably monitored by the sensor system.

Another problem with this particular system is that the number of sensors which may be used in the array or the frequency range of the signals to be detected are limited based on the range of FM frequencies which are utilized in the ramp signal, and on the period of the ramp signal. More specifically, since a different central frequency is produced for each sensor, the amount of difference between each such central frequency and the overall range of frequencies within which these central frequencies are contained dictates the number of sensors which may be utilized. Equivalently, the number of sensors, together with the overall range of frequencies determine the maximum difference between central frequencies, and hence the maximum environmental frequencies which may be detected. The range of frequencies is, of course, determined by the slope and period of the ramp signal.

These sensor configurations are also limited in the distance from the optical source which a given sensor may be positioned, not only due to the limitations based on the coherence length of the optical source, but also based on the fact that as the sensor is moved further from the optical source, the path length difference between adjacent optical paths becomes very large.

Another approach which has been used for separating each sensor's information from the single data stream comprises time-division multiplexing of the sensor outputs, as is described by M. L. Henning et al., "Optical Fibre Hydrophones with Down lead Insensitivity," *I.E.E. Conference Publication* 221, pages 23–27, (April 1983). In time-division multiplexing, the optical input most generally is pulsed so that the input signal comprises a pulse waveform. In the interferometric pulsed system described by Henning et al., the input light is pulsed twice with a particular delay between the two pulses. This delay is determined by the geometry of the sensor, and in particular by the relative delay between the two arms of the interfometer comprising the sensor. Specifically, the optical input pulses communicated through each sensor are mixed and placed on the output fiber by each of the sensors at a different time. By controlling the relative position of the sensors, interleaving of the pulse signals may be accomplished as the signals are multiplexed from the sensors onto a return fiber bus. These interleaved pulse signals are then carried back to the central processing location where demultiplexing and further signal processing occur.

One of the problems with these types of systems is that they generally have required use of an optical source having a coherence length which is longer than the path length difference between adjacent signal paths. The long coherence length is necessary in order to have the light from adjacent paths interfere. The interference creates an intensity modulation which is proportional to the phase modulation created in the light by the environment. In addition, the two pulses which are launched into the sensor array are generated from the source at different times. The result of mixing light which originates from the source at different times is phase induced intensity noise. Such source phase induced noise may create a limitation to the sensitivity of a sensor in such a system. Another limitation with these types of devices is that they measure only the difference between the sensors, and do not provide a means for measuring the environmental effects on a selected sensor by itself.

Based on the above, it would be an important improvement in the art to provide a sensing system and technique for multiplexing a plurality of remote sensors without being subject to the above-identified restrictions. Thus, the system should optionally be free of sensor spacing limitations, and experience little degradation of the signals carried thereon due to laser phase-induced intensity noise. Such a system should provide for operation without requiring use of electronics or active devices in the environmental sensing region. The system should provide for maximized duty cycle operation to increase the efficiency and potential applications of the system. Preferably, such a system should permit use of any of a wide range of optical sources, including short or moderate, as well as long, coherence length sources where the coherence length is greater than or equal to about one centimeter, and should be both simple and economical to produce and use in actual application.

BRIEF SUMMARY OF THE INVENTION

The present invention comprises a distributed sensor system and method which preferably uses a short coherence length light source for accomplishing multiplexing of an array of fiber-optic sensors. More specifically, the sensor system of the present invention generally comprises an optical source which is optically coupled to provide pulsed optical signals to a first plurality of waveguide segments which define at least a portion of first and second light paths of different length for carrying light coupled from the light source. At least a portion of these first and second light paths defines a first unbalanced interferometer. At least one second optical waveguide segment is provided for propagating light through at least a portion of third and fourth light paths. At least a portion of the third and fourth light paths defines a second unbalanced interferometer. The difference in path lengths between the third and fourth light paths is substantially equal to the difference in path lengths between the first and second light paths.

A third optical waveguide segment is optically coupled to one of the first plurality of optical waveguide segments and to the second optical waveguide segment so that light from the first plurality of waveguide segments is propagated to the optical connection with the second waveguide segment through a fifth light path. At least a portion of one of the first, second, third, or fourth light paths comprises a sensing region which is influenced by an environmental effect, and this influence is evidenced by a change in phase of the optical signal propagating in the sensing region. Means are provided for combining light pulses from the first, second, third and fourth light paths, and for coherently coupling light only from light paths substantially equal in length, with the coherently coupled light including only one signal which has propagated through the sensing region. Accordingly, the phase of the light signal is influenced by an amount related to the change effected on the light propagating in the sensing region.

Optically coupled to the means for combining light are electronic detectors which receive the coupled light therefrom. The coherently coupled light comprises a phase difference signal corresponding to the difference in phase between light which traveled through similar length paths. One of those paths comprises the shorter of the first and second light paths and the longer of the third and fourth light paths. The other of those paths comprises the longer of the first and second light paths and the shorter of the third and fourth light paths. This phase difference is representative of the environmental conditions affecting the sensing region in the selected light path in the sensor system. The detectors are typically interconnected to other information processing devices for monitoring and evaluating the particular environmental conditions which have been detected.

In one preferred embodiment, the invention comprises a "parallel" configuration in which an optical source such as a short coherence length laser launches pulsed optical signals into a single-mode fiber-optic input bus from whence the signals are distributed to a plurality of optical fibers or other components such as electronic transducers comprising sensors which are each optically connected at one terminal to the input fiber-optic bus, and which are connected at their other terminal to a fiber-optic output bus, thereby forming a ladder configuration. The pulses are timed such that the return pulses from the sensors do not overlap with each other or with pulses from the next sampling of the array.

Each sensor imprints environmental information onto the light passing therethrough in the form of modifications to the optical phase. Light from each of the sensors is optically coupled onto the fiber-optic return bus. The difference between the lengths of each of the light paths defined by the input fiber-optic bus, an individual sensor, and the fiber-optic return bus is much greater than the coherence length of the optical source, so that intensity modulation does not occur when the light from each sensor is collected onto the fiber-optic return bus.

A Mach-Zehnder interferometer is constructed on the return bus to receive the signals coupled from the sensors. The arms of the Mach-Zehnder interferometer are of different lengths, with the difference in the arm lengths being equal to the difference in path lengths between each two adjacent sensors. Consequently, the interferometer causes mixing of the outputs of adjacent sensors and produces an output signal corresponding to the difference in phase between signals passing through the adjacent sensors. This difference information relates directly to the environmental conditions which influenced the particular sensor. A frequency shifter can be placed in one arm of the Mach-Zehnder interferometer to produce a heterodyned output.

In another preferred embodiment, the above-described system is modified by locating environmentally sensitive regions defining sensors on a portion of the fiber-optic input bus between each pair of rungs in the ladder structure of the system. This configuration minimizes the required number of optical components. In addition, because the sensors are positioned on the input bus, or optionally on the output bus, no additional delay line is needed to separate the pulses from adjacent sensors. In addition, in this embodiment, every pulse from the optical source except the first and last pulse can provide information from a sensor, thereby permitting optimization of the output duty cycle. Again, the path length difference for optical signals traversing paths between adjacent sensors is equal to the path length difference between the arms in the sensing interferometer positioned on the return bus.

In still another preferred embodiment, a Mach-Zehnder interferometer is positioned on each rung of the ladder structure of the system. Again, the lengths of the arms of each of the sensing interferometers on the rungs correspond in difference by an amount which substantially matches the arm length difference of the compensating interferometer. In this system, the pulse communicated from the optical source produces two pulses from each sensing interferometer, for transmission on the return bus to the compensating interferometer. Accordingly, the pair of signals from a given sensing interferometer are caused to constructively interfere at the output of the compensating interferometer, producing an amplitude modulation. Photodetectors at the output of the compensating interferometer may monitor the amplitude modulation corresponding to the phase modulation of the given sensor, and produce a signal representative of the environmental conditions which influenced that sensor.

In each configuration of the invention, the compensating interferometer can also be located on the input bus between the optical signal source and the sensing regions. In this configuration, the two optical signals produced by the compensating interferometer from each single optical pulse signal received from the source are combined by the sensing interferometers to provide a coherently coupled signal on the return path. This coherently coupled signal is received by the detector and processed in the same manner as if the signal were received from the compensating interferometer in the configurations described above.

In still another preferred embodiment of the system, the configuration described above can be modified by cutting each waveguide in the run in half, and depositing a reflective mirror on the cut end of the waveguide to reflect optical signals back into the waveguide. In this configuration, adjacent waveguides defining rungs form, in conjunction with the interconnecting portion of the input waveguide, a Michelson interferometer. If sensing regions are located on the input waveguide, the length of each region is reduced by half since the light reflected on the input bus from each interfomerter will pass through the sensing region twice, once when coming from the source and once when returning. The returning signals are transmitted to a compensating interferometer and processed as with the other embodiments described above. This configuration minimizes the amount of optical fiber needed to form the sensor but has some loss in efficiency due to the use of an additional optical coupler to transmit reflected light returning on the input waveguide to the compensating interferometer.

Each of the configurations of the present invention are lead insensitive since the signals are carried on a common fiber except while in the sensor or compensating interferometer. Thus, environmental shielding is needed only on the compensating interferometer in order to obtain signals which, if proper techniques are used to avoid signal fading, directly reflect changes in the selected sensor.

The present invention also includes a novel apparatus and technique which may be utilized in several of the configurations of the invention to provide a heterodyne-like output signal, without the use of an optical frequency shifter. In heterodyning, the frequency of the signal is shifted so that the information contained by the signal is carried on sideband frequencies of the resulting non-zero center frequency. Heterodyning is desirable since it overcomes the problem of signal fading due to low frequency environmental influences on the fiber. In addition, the heterodyned signal can be readily evaluated by use of conventional electronic equipment such as spectrum analyzers, FM demodulators or phase detectors. The present invention avoids the use of a frequency shifter for heterodyning by providing a phase modulator in the receiver portion of the sensor, together with a signal processing technique for turning the resulting phase modulated signal into a frequency shifted electronic signal.

The phase modulator is operated at a frequency much higher than that of the signal in the sensor. A switching component, such as a gate, is used to modulate the electronic signal from the optical detector, in a manner synchronized to the operation of the phase modulator. Thus, the output signal from the receiver effectively multiplies the detected signal by a square wave at the higher modulation frequency, mixing the harmonics of that modulation frequency in the signal. Since odd and even harmonics never simultaneously fade, it is possible to eliminate signal fading by mixing the two harmonics as described. When the modulation amplitude of the phase modulator and the synchronization of the gate are adjusted appropriately, the output signal will contain a heterodyne-like signal around one of the modulation frequency sidebands.

The distributed array sensors of the present invention comprise a system and technique for multiplexing remote sensors which is accurate, and which permits detection of rapidly changing environmental conditions which influence the sensors. The invention permits use of optical sources having a short coherence length, thereby including a wide range of commercially available lasers which are less expensive and more compact and rugged than those having longer coherence lengths. Of course, the invention is not limited to use of such short coherence length lasers, but may use any optical source having a coherence length which is greater than or equal to about one centimeter. Further, the invention preferably accomplishes its purpose in an all fiber-optic configuration, eliminating unnecessary bulk optic components which degrade system performance by reducing reliability and increasing system loss and complexity. The system is configured to be lead insensitive, permitting use of long lines for carrying optical signals to and from connection with each unbalanced interferometer, without the need for environmental shielding of those lines. The invention also includes a technique for effectively heterodyning the output signal, which removes the need of frequency shifters in the compensating interferometer, thereby further reducing the cost and increasing the accuracy of the sensing system.

BRIEF DESCRIPTION OF THE DRAWINGS

FIG. 1 is a schematic drawing of one preferred embodiment of a distributed fiber-optic sensor system of the present invention.

FIG. 2 is a sectional view of one embodiment of a fiber-optic directional coupler for use in the distributed sensor system of the present invention.

FIG. 5 is a schematic drawing of still another preferred embodiment of the distributed sensor system of the present invention, utilizing a configuration forming Michelson interferometers connected to the input waveguide.

FIG. 6 is a schematic drawing of another preferred embodiment of the invention, providing another configuration of Michelson interferometers connected to the input waveguide.

FIG. 9 is a schematic drawing of a simplified version of an embodiment of the coherent distributed sensor system of the present invention.

FIG. 11 is a perspective view of one embodiment of a fiber-optic polarization controller for use in the distributed sensor of the present invention.

DETAILED DESCRIPTION OF THE PREFERRED EMBODIMENT

Figure 3:
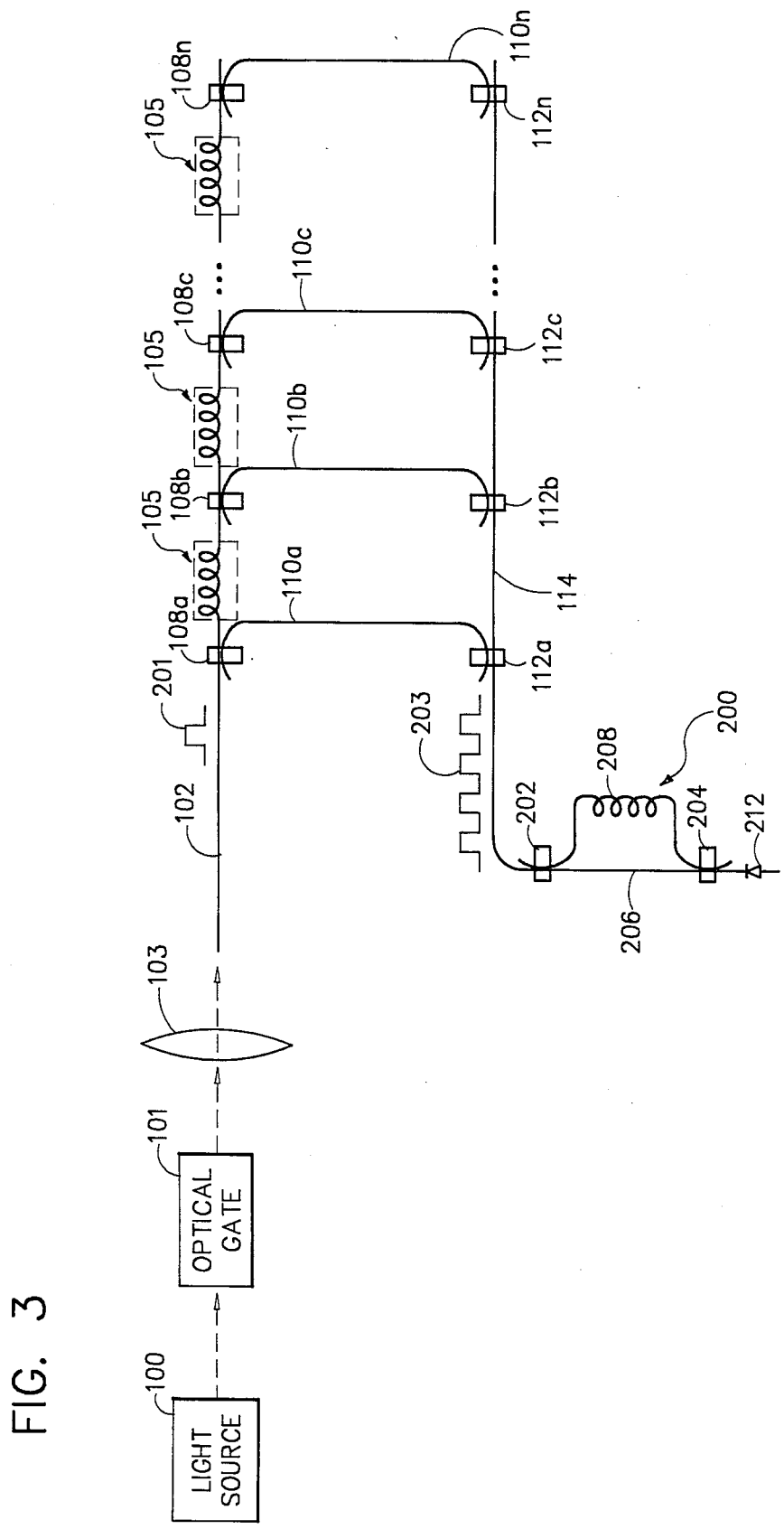
FIG. 3 is a schematic drawing of another preferred embodiment of the distributed sensor system of the present invention, illustrating sensors positioned on the input waveguide of the system.

The invention is best understood by reference to the figures wherein like parts are designated with like numerals throughout.

FIG. 1 illustrates one preferred embodiment of the invention comprising a sensor array system for monitoring environmental conditions influencing a plurality of distributed sensors. A light source 100, such as a laser diode, which preferably has a short coherence length is utilized in this embodiment. To produce the desired pulsed optical signal output, the light source 100 an comprise either a continuous wave laser which is electronically or mechanically pulsed, or a self-pulsed laser.

Coherence length means the length over which signal interference effects may be obtained. Those skilled in the art will appreciate that the coherence length ($L_c$) may be defined, for at least some types of laser sources, by the following relationship:

$$(v_g/2\pi\Delta f) = L_c \quad (1)$$ where $2\Delta f$ = optical bandwidth at $\frac{1}{2}$ maximum power; and
$v_g$ = group velocity of light in an optical fiber.

Thus, from Equation (1) it becomes apparent that the coherence length increases as spectral purity of the laser improves. It will also be appreciatd by those in the technology that, in comparison to the prior art systems requiring longer coherence length sources, a sensor system which can utilize short coherence length signal sources comprises a versatile system in which any of a large number of laser light sources may be used, including relatively inexpensive and compact diode lasers.

In the embodiment shown, the light source 100 comprises an Aluminum Gallium Arsenide (AlGaAs) laser which produces light having a wavelength on the order of about 820 nm. By specific example, the light source 100 may comprise a model HLP1400 laser diode, commercially available from Hitachi Limited, 6-2, 2-Chome Otemshi Chiyoda-Ku, Tokyo 100, Japan.

The light source 100 of FIG. 1 is optically coupled to an optical fiber comprising fiber-optic input bus 102. Positioned upon input bus 102 are a plurality of directional couplers 108a, 108b, . . . 108n which couple some of the optical power to a plurality of optical fibers 110a, 110b, . . . 110n which are each optically connected to one of the directional couplers 108. The basis for selecting the locations of couplers 108 on input bus 102 will be explained more fully subsequently.

In the illustrated embodiment, the directional couplers 108 are of the same type as other directional couplers utilized in the sensor system. One preferred embodiment of a directional coupler which may be used in the system is disclosed subsequently herein, and is described in detail in U.S. Pat. No. 4,493,528 entitled "Fiber-Optic Directional Coupler" and U.S. Pat. No. 4,536,058 entitled "Fiber-Optic Directional Coupler", both of said patents being assigned to the assignee of the present invention. These patents are hereby incorporated by reference.

The optical fibers 110a, 110b, . . . 110n each have a first end extending through ports of a corresponding optical coupler 108a, 108b, . . . 108n. The optical fibers 110 comprise fiber-optic sensors which are positioned in the environment so as to be sensitive to, and influenced by, changes in the environmental conditions surrounding the sensors 110. Of course in this, as well as substantially all other embodiments of the invention, devices such as transducers could be connected to the optical fibers in the system and be utilized as sensors 110 for responding to environmental effects by influencing the flow of light through those optical fibers. For example, an acoustic transducer could be connected to an optical fiber 110 to increase acoustic sensitivity of that fiber.

The second end of each of the sensors 110 passes through one of a plurality of directional couplers 112a, 112b, . . . 112n. Couplers 112 are positioned at selected locations on a fiber-optic return bus 114, bringing the sensors 110 into optical coupling relationship with the return bus 114. It will be appreciated that the abovedescribed relationship defines a ladder network for the sensor arm of the sensing system.

The optical source of FIG. 1 is pulsed to produce an input pulse 201 which is distributed to the various sensors 110 via input bus 102 and directional couplers 108a–108n. As the pulse 201 travels down line 102 and is distributed to the various sensors 110, a string of pulses 203 is produced on return bus 114 with each pulse in the string coming from a different sensor 110. The spacing between each pulse in the string 203 is based upon the optical path difference between adjacent sensors 110. Thus, the first pulse in the string will correspond to the pulse which was communicated through sensor 110a, since this optical pulse had the shortest travel time between the light source 100 and the return bus 114. Likewise, the second optical pulse corresponds to the pulse provided from sensor 110b, since this pulse had the next shortest optical path length from the light source 100 to return bus 114. The spacing of the pulses in this embodiment is not based on the coherence length of the optical source since this pulsed system is not coherence dependent. Therefore, an optical source of any of a broad range of coherence lengths may be used in this embodiment.

Of course, the pulse length of the pulses from the light source 100 should be adjusted so that the return pulses from the sensors do not overlap with each other. Further, the pulses from light source 100 should be timed so that the return pulses from the sensors do not overlap with pulses from the next sampling of the array. For example, if the pulse length from light source 100 were too long, the length of the pulse communicated from sensor 110a onto return bus 114 may be such that the tail of the pulse would not be placed on bus 114 at coupler 112a before the leading edge of the pulse from sensor 110b passes through coupler 112a on return bus 114. Likewise, if the timing of the pulses from light source 100 is too close together, the output pulse from sensor 110a corresponding to the second pulse from the light source could be placed on the return bus 114 before the output pulse from sensor 110n corresponding to the first pulse from light source 100 passes couplers 112a on the return bus 114. In either of these situations, it would be virtually impossible for a detector, receiving the pulses from the return bus 114, to determine which sensor those pulses had been received from.

The string of pulses 203 is transmitted along fiber-optic return bus 114 to the input of the Mach-Zehnder interferometer 200 which is comprised of a pair of directional couplers 202 and 204 positioned on the fiber-optic return bus 114 so as to define a first arm 206 between the couplers. A second length of optical fiber 208 is secured at either of its ends in the couplers 202 and 204 so as to define a second arm of the interferometer between couplers 202 and 204. The difference in optical path lengths of arms 206 and 208 should substantially equal the difference between optical path lengths of successive sensors. Optionally, arm 206 could be of a length greater than arm 208 by an amount which substantially equals the difference between the optical path lengths of successive sensors.

With the arm lengths chosen as described above, the pulses pass through interferometer 200 such that the portion of the first pulse from string 203 which traverses the longer arm 208 reaches coupler 204 at substantially the same time as does the portion of the second pulse from string 203 which traverses the shorter arm 206. Likewise, the portion of that second pulse which traverses arm 210 arrives at the coupler 204 substantially at the same time as does the portion of the third signal from string 203 which traverses arm 206. Thus, it is seen that the interferometer 200 will cause mixing in the optical coupler 204 of the output signals from adjacent sensors.

The mixed signal which is output from coupler 204 is communicated to a detector 212 positioned on that portion of fiber 208 which extends beyond coupler 204. Optionally, detector 212 could be positioned on the portion of fiber 114 which continues beyond coupler 204 from fiber 206. Still further, twin detectors 212 could be positioned one each on the detector locations just described.

The detector 212 receives the mixed signal, which represents the gradient of the environmental parameter influencing the related sensor. One preferred embodiment of a detector for use in the system of the present invention may comprise a model MFOD2404 detector preamplifier, commercially available from Motorola Semiconductors, Phoenix, Ariz. Of course, connected to the output of the detector 212 for each of the embodiments of the invention is appropriate measuring equipment (not shown) of a type which is generally used in the technology for monitoring and evaluating such optical output signals.

In the embodiments illustrated herein, the optical path length differences between adjacent optical paths are made to conform with the optical path length difference in interferometer 200. By so doing, and with proper spacing of the paths and/or proper timing of pulses from the optical source, all pulses returning from the sensing region can be processed through a single interferometer 200. However, if the difference between adjacent optical path lengths in the sensing region is not substantially the same as the path length difference of interferometer 200, then other interferometers can be optically coupled to return bus 114 to define path length differences which correspond with those other path length differences in the sensor region. Such additional interferometers could be optically coupled either in parallel or series configuration with interferometer 200 on waveguide 114.

System performance is greatly enhanced, and undesirable conditions such as phase induced intensity noise are minimzied by the ability to closely match the optical path length difference in compensating interferometer 200 with the optical path length difference between optical signals to be combined in the interferometer 200. Various techniques and systems are generally known in the industry for matching these optical path length differences. One preferred embodiment of a method and system for accomplishing this close matching is disclosed in U.S. patent application Ser. No. 877,321 filed June 23, 1986, to Kim et al., entitled "System and Method for Accurate Loop Length Determination in Fiber-Optic Sensors and Signal Processors," which application is filed concurrently herewith. This reference is hereby incorporated herein by reference.

In the embodiment of FIG. 1, as well as in the other embodiments described herein, a frequency shifter (not shown) may optionally be positioned in the system, such as on one arm of the compensating interferometer. The frequency shifter is utilized to shift the frequency of the optical signal and, therefore, to "heterodyne" the matched optical signal detected by detector 212. By heterodyning, the phase modulated output signal enters the detector 212 as a comparatively low frequency phase modulation of a higher frequency amplitude modulated optical signal. Heterodyning provides a method by which lower frequency environmental effects can be prevented from reducing the system's sensitivity to small signals in the desired frequency range. Thus, those environmental effects in the desired frequency range can more readily be identified.

One preferred embodiment of a frequency shifter which may be utilized for this purpose is a Bragg Cell modulator, which is well-known in the technology, many types of which are commercially available. Such frequency shifters are comprised of bulk optics, which are inserted into the system by separating the fiber. Light is coupled to and from such bulk optic devices by lenses. It becomes apparent that the use of bulk optics such as Bragg Cells for frequency shifters increases the system loss and reduces overall efficiency and quality of performance. Another technique for accomplishing heterodyining in the coherence distributed sensor of the present invention, without the necessity of frequency shifters and without experiencing the losses involved with the use of bulk optics, is described in detail subsequently with reference to FIG. 8.

With respect to the coupling of light signals in the present invention, a more detailed description of a preferred fiber-optic directional coupler which may comprise couplers 108 and 112, for example, may be provided by reference to FIG. 2. Specifically, this coupler comprises two optical fiber strands labeled 150a and 150b in FIG. 2 of a single mode fiber-optic material having a portion of the cladding removed from one side thereof. The two strands 150a and 150b are mounted in respective arcuate slots 152a and 152b, formed in respective blocks 153a and 153b. The strands 150a and 150b are positioned with the portions of the strands where the cladding has been removed in close-spaced relationship, to form a region of interaction 154 in which the light is transferred between the core portions of the strands. The amount of material removed is such that the core portion of each strand 150a and 150b is within the evanescent field of the other. The center-to-center spacing between the strands at the center of the coupler is typically less than about 2 to 3 core diameters.

It is important to note that the light transferred between the strands at the region of interaction 154 is directional. That is, substantially all of the light applied to input port A is delivered to the output ports B and D without contra-directional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially nondiscriminatory with respect to polarizations, and thus preserves the polarization of the coupled light. Thus, for example, if a light beam having a vertical polarization is input to port A, the light coupled from port A to port D, as well as the light passing straight through from port A to port B, will remain vertically polarized.

From the foregoing, it can be seen that that coupler may function as a beam splitter to divide the applied light into two optical paths, as is accomplished by coupler 104 of FIG. 1.

In the embodiment shown in FIG. 2, the coupler has a coupling efficiency which may be varied based on the positioning of the fibers with respect to each other. As used herein, the term "coupling efficiency" is defined as the power ratio of the coupled power to the total output power, expressed as a percent. For example, referring to FIG. 2, if light is applied to port A, the coupling efficiency would be equal to the ratio of the power at port D to the sum of the power output at ports B and D. In the distributed sensor of the present invention, careful adjustment of the relative path lengths and of the coupling efficiencies of the couplers is required to achieve optimum efficiency and performance.

Another preferred embodiment of the distributed sensor system is illustrated in FIG. 3. In this embodiment, a light source 100 such as a continuous wave optical laser is optically connected to an optical gate 101 for producing pulsed optical signals. The optical gate 101 is optically connected via a line 103 to a fiber-optic input bus 102. Secured in spaced relationship along input bus 102 are a plurality of optical couplers 108a, 108b, 108c, . . . 108n which optically connect bus 102 to a plurality of sensors 110a, 110b, 110c, . . . 110n which themselves are optically coupled via a plurality of optical couplers 112a, 112b, 112c, . . . 112n to a fiber-optic return bus 114. This configuration corresponds to the ladder network of the sensor arm of the embodiment illustrated in FIG. 1.

Portions of the input bus 102 between sets of couplers 108 are configured in a coil arrangement generally indicated at 105. The coils 105 comprise delay lines for defining the difference in signal path length traveled by optical signals passing in adjacent sensor arms 110. In addition, at least a portion of each of the coils 105 is not environmentally shielded, thereby forming a sensor located on the input bus. By positioning the sensors and delay lines on the input bus, the number of optical components required in this ladder portion of the structure is minimized. Also, by positioning the sensors on the input bus, every pulse on the return bus 114 except the first and last pulse corresponding to a given pulse from the light source can provide information from an individual sensor so that differences in phase between adjacent pulses on return bus 114 define environmental conditions influencing a particular sensor. In contrast to the embodiment illustrated in FIG. 1, which provides a measure of the difference in the environment between sensors 110a and 110b, for example, the embodiment illustrated in FIG. 3 provides a direct measure of the environment at sensor 105.

For example, when an optical pulse 203 having traveled the optical path through arm 110b is combined with a pulse 203 having traveled the optical path through arm 110a, the phase difference signal provided from coupler 204 will directly relate to the environmental effect influencing the pulse which passed through the sensing region 105 between couplers 108a and 108b. This occurs because both combined pulses traveled a common optical path through any other sensing regions in their path on waveguide 102, however, only one signal in this pair passed through the sensor between couplers 108a and 108b. Therefore, the phase change caused in that signal while passing through that sensor will be directly evidenced by the phase difference signal from coupler 204.

By providing sensor information for a given sensor on all but the first and last pulses on the return bus 114, as indicated above, the output duty cycle can be substantially optimized in the configuration of FIG. 3. This is accomplished by spacing the sensors 110 with respect to each other so that the optical path length differences between adjacent sensors are substantially the same for each sensor pair. Thus, all but the first and last signal from a pulse 201 can be used in the compensating infeterometer 200 to develop sensor information. This duty cycle can be further optimized by timing the optical pulse signal from the light source 100 so that the resulting pulse signal placed on return bus 114 from rung 110a immediately follows the passage of the pulse on bus 114 from arm 110n, and is synchronized therewith, thereby reducing the minimum time between transmission of pulses from the optical source.

Return bus 114 is connected to provide the optical signals traveling therein to a Mach-Zehnder interferometer 200 which corresponds to the interferometer described with reference to FIG. 1. As with the configuration of FIG. 1, the adjacent signals communicated to interferometer 200 from return bus 114 are mixed to provide an output from coupler 204 which is communicated to a detector 212. The mixed signal comprises a phase difference signal which represents the environmental parameter influencing the sensor through which only one of the adjacent signals has passed.

As with the configuration of FIG. 1, the difference in optical path lengths traveled by the optical signal between adjacent sensors should substantially equal the path length difference of the arms 206 and 208 of the interferometer 200.

In operation, a light source 100 such as a laser diode communicates a continuous wave optical signal to the optical gate 101. Gate 101 gates the optical signal to produce a series of pulsed output signals at a rate and signal length which will avoid the signal overlapping problems described earlier. One such optical pulse signal is illustrated at 201. The optical pulse 201 is communicated via lens 103 into the input bus 102. As the optical signal 201 continues to travel down input bus 102, portions of it are transmitted via couplers 108 through sensors 110 and couplers 112 to the fiber-optic return bus 114 in the manner previously described with respect to FIG. 1. The signals returning on bus 114 comprise a signal train illustrated at 203, with the signals spaced at intervals such that interference will occur between adjacent signals at coupler 204, following transmission of the signals through the interferometer 200.

Optionally, a frequency shifter (not shown) may be included in the fiber delay line 206 or 208 of the embodiment of FIG. 3, thereby providing a heterodyned signal as was previously discussed with respect to FIG. 1.

Figure 4:
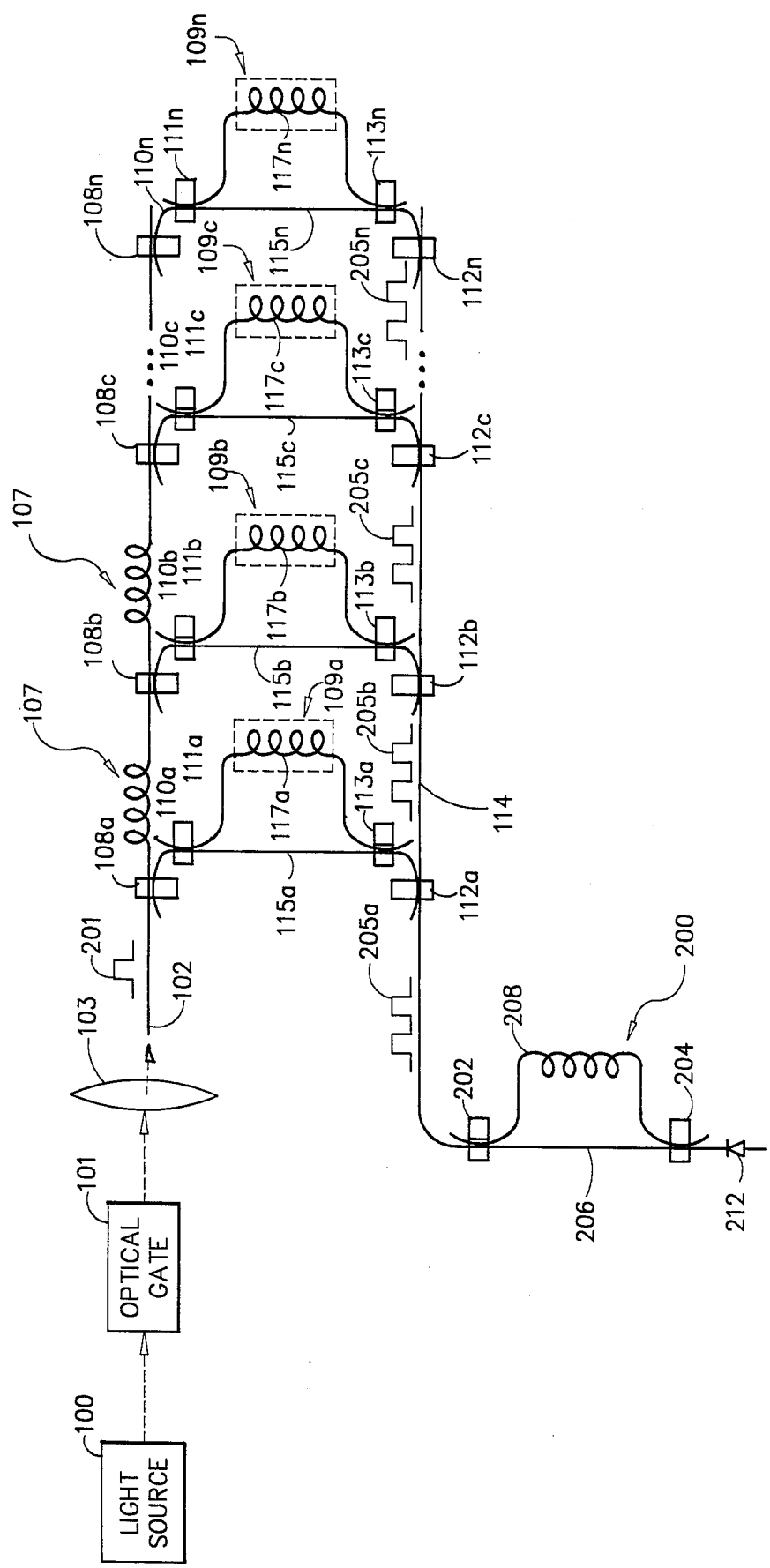
FIG. 4 comprises another preferred embodiment of the distributed sensor system of the present invention, illustrating sensors comprising Mach-Zehnder interferometers positioned on each rung of the ladder configuration of the invention.

Another preferred embodiment of the distributed sensors system of the present invention can be described by reference to FIG. 4. The system of FIG. 4 is configured substantially identically to the system of FIG. 3, except that the portions of input bus 102 between adjacent couplers 108 comprise only delay lines generally indicated at 107. These portions are not exposed to environmental influence, as was the case in the device of FIG. 3. The sensing is accomplished in the illustrated embodiment by constructing Mach-Zehnder interferometers such as those illustrated generally at 109a, 109b, 109c, ... 109n on the rungs 110 of the ladder configuration.

More specifically, each rung 110 comprises a first optical coupler 111a, 111b, 111c, ... 111n, and a second optical coupler 113a, 113b, 113c, ... 113n, which define the length of a first arm 115a, 115b, 115c, ... 115n of the interferometer 109. Also connected at opposite ends to the couplers 111 and 113 on each rung 110 is a second arm of the interferometer comprising a sensing arm 117a, 117b, 117c, ... 117n.

Preferably, the optical path length difference between the arms in each of the sensing interferometers 109 is substantially identical to the optical path length difference between the arms of the compensating interferometer 200.

In operation, a series of pulsed optical signals such as the pulse signal illustrated at 201 is produced and transmitted into the input bus 102 in the manner previously described with respect to FIGS. 1 and 3. As the optical signal 201 travels down the input bus 102, a portion of the signal is coupled via couplers 108 into the rungs 110. The signal in each of the rungs 110 is communicated through the interferometer 109 of that rung, with the result that a portion of the signal is communicated through the first arm 115, with another portion going through the second sensing arm 117. The output from each interferometer is communicated via couplers 112 onto the return bus 114. This output comprises a pair of optical pulse signals 205a, 205b, 205c, ... 205n for each signal communicated into the sensing interferometer 109. EAch pair of optical pulse signals 205 travels down output bus 114 and is received in the compensating interferometer 200.

With the optical path length difference of the interferometer 200 matched to each of the path length differences of the interferometers 109, the pair of optical pulse signals 205 produce a pair of signals which are caused to constructively interfere in coupler 204, to produce a phase difference signal on the output of coupler 204. This phase difference output is representative of the phase difference of the pair of signals 205 after traversing the separate arms of their particular interferometer 109. Accordingly, the phase difference signal indicates the environmental effect on the particular sensor arm 117 of the interferometer 109 which influenced the phase of the signal passing therethrough. The phase difference signal from coupler 204 is communicated to the detector 212, from whence it is communicated to processing equipment for use in evaluating the environmental parameters which influenced the sensing arm of the interferometer 109 through which the signal pair traveled.

Because each rung 110 contains its own Mach-Zehnder interferometer, and so long as the rungs are spaced sufficiently and signal pulses are separated properly to prevent signal overlap on the return bus 114, the monitoring of environmental effects on a particular sensing interferometer 109 is accomplished without sensing involvement of signals from any other sensing interferometer 109. As a result, there is essentially no restriction on the length of the input bus 102, or the output bus 114, between adjacent rungs of the system. Accordingly, a distributed sensor such as that disclosed with reference to FIG. 4 finds particular value in applications requiring sensors to be located at selected points which may not be equidistant from one another, and which may be at extended distances from the light source 100 or from the compensating interferometer 200.

It is noted that in the system of FIG. 4, like the arrangement of the other embodiments disclosed herein, the optical signal is a pulsed signal. Therefore, the positioning of the couplers 108 and rungs 110 is not dependent upon the source coherence length of the light source. However, the pulses from light source 100 should be timed such that the pulses returning to the compensating interferometer 200 do not overlap each other, nor interfere with pulses produced by the next pulse from light source 100.

Referring now to FIG. 5, another embodiment of the device which is the equivalent of the embodiment of FIG. 3 may be described. Specifically, like the embodiment of FIG. 3, the system illustrated in FIG. 5 includes a light source 100 which can comprise a self-pulsed laser for producing a pulsed optical signal, or which can comprise a continuous wave laser optically connected to an optical gate 101 for electronically or mechanically gating the optical signal to produce a pulsed optical output. The pulsed optical signal is communicated via lens 103 to an optical fiber input bus 102.

A first optical coupler 104 is positioned on input bus 102 and is connected to one end of an optical fiber comprising a return bus 207 such that optical signals are coupled between the input bus 102 and the return bus 207 through coupler 104. Return bus 207 is optically connected at its other end to a Mach-Zehnder interferometer 200 which corresponds in configuration to the interferometer 200 previously described with respect to the embodiments of FIGS. 1, 3 and 4. The output of the interferometer 200 is also connected to a detector 212 in the manner previously described.

Also positioned at selected locations on input bus 102 are a plurality of optical couplers 108a, 108b, 108c, . . . 108n. Couplers 108 are each connected to a first end of an optical fiber 220a, 220b, 220c, . . . 220n. The other end of each of the optical fibers 220 is optically connected to a reflective mirror 222a, 222b, 222c, . . . 222n. Reflective mirrors 222 are positioned in a configuration so as to directly reflect light traveling downward through optical fibers 220 back in the opposite direction through fibers 220. Such mirrors may comprise metal or other reflective material which is deposited directly on the fiber end. The optical fibers 220 are approximately $\frac{1}{2}$ as long as the rungs 110 of FIG. 3. Thus, the total optical path traversed by an optical signal entering one of the optical fibers 220 and then reflected back through the optical fiber 220 would be substantially the same distance as the optical path of light traveling through the corresponding rung 110 of the embodiment of FIG. 3.

At positions between adjacent optical couplers 108, the input bus 102 is configured to form a delay line which creates an optical path of a desired length. At least a portion of each delay line is exposed to the environment or is otherwise configured to be susceptible to environmental influence, so as to define a sensor for imprinting environmental information on optical signals traveling within the sensing portion of the input bus 102. The optical path length defined by the delay line 224 is selected to create an optical path length difference between paths of optical signals reflected through adjacent optical fibers 220 which corresponds to the optical path length difference between the arms of the compensating interferometer 200.

Accordingly, since the signal reflected from mirror 222 through fiber 220 travels the delay and sensing portion twice, the length of each delay coil 224 as well as the length of each portion of bus 102 which is exposed to environmental influence should be approximately $\frac{1}{2}$ the length of the corresponding delay coils and sensor regions 105 of FIG. 3. The number of optical fibers 220 and delay portions 224 are selected based upon the number of different locations to be monitored, or the number of environmental sensors to be monitored.

The relationship between the adjacent optical fibers 220 in this configuration corresponds to a Michelson inteferometer. For example, the portion of the device of FIG. 5 defined by optical coupler 108a, optical fiber 220a, and reflective mirror 222a, in combination with input bus 102, delay line and sensor 224, and optical fiber 220b and associated mirror 222b define a conventional Michelson interferometer. Thus, optical signals reflected from the optical fibers 220 are communicated back onto input bus 102 and then through coupler 104 onto the free end 235 of return bus 207 to produce a series of optical signals similar to those produced on return bus 114 of FIG. 3.

More specifically, in operation of the device of FIG. 5, an optical pulse 201 is communicated from the light source 100 and optical gate 101 through lens 103 to the optical input bus 102. Although a portion of the optical signal 201 is communicated via coupler 104 onto return bus 207, the remainder of the optical signal 201 travels down input bus 102 and is partially coupled in each of the couplers 108 onto its associated optical fiber 220. In each case, the signal on optical fiber 220 is reflected by the reflective mirror 222 so as to return through the optical fiber 220 and again be coupled through coupler 108 onto the input bus 102. These reflected signals travel along input bus 102 toward the optical signal source 100 and are partially coupled through coupler 104 onto return bus 207. As a result, a string of optical pulses 203 are communicated from the system onto the return bus 207. Since each of the optical fibers 220 are half the length of the rungs 110 of FIG. 3, and since the delay and sensor portions 224 are half as long as the corresponding delay and sensor portions 105 of FIG. 3, the optical path of each of the signals 203 on return bus 207 will correspond to the path length traveled by the optical pulse signals 203 of FIG. 3.

The optical pulse signals 203 are communicated from return bus 207 into interferometer 200 and processed in the manner previously described with respect to FIG. 3. The resulting signal detected by detector 212 from the output of interferometer 200 provides a phase difference signal representative of the environmental influence on the optical sensor located between the two adjacent optical fibers 220 traveled by the two optical signals combined in the coupler 204 of interferometer 200.

It will be appreciated that the embodiment of FIG. 5 accomplishes substantially the same function and operation as the ladder configuration of the device of FIG. 3, but does it without the use of a return bus connected to each of a plurality of ladder-type rungs. However, the embodiment of FIG. 5 does cause the optical signals to each pass through one additional coupler 104, since the input signal passes through this coupler after being coupled onto the input bus 102, and the signals reflected from the optical fibers 220 also pass through that coupler 104. As a result, the embodiment of FIG. 5 experiences about a 6 dB loss in peformance as compared to the embodiment of FIG. 3.

The embodiment of the invention illustrated in FIG. 4 can also be modified by replacing the return bus 114 and sensing Mach-Zehnder interferometers with equivalent Michelson interferometers. The embodiment for accomplishing this can best be described by reference to FIG. 6. As with the previous embodiments of the invention, this system also utilizes a pulsed light source 100 which can comprise either a continuous wave laser which is electronically or mechanically pulsed by means such as an optical gate 101, or through use of a self-pulsed laser. In either configuration, the pulsed optical signal is communicated from the self-pulsed optical laser 100, or the optical gate 101 through a lens 103 to an optical input fiber 102. Positioned on the input fiber is an optial coupler 104 which is connected to one end of an optical fiber return bus 207. Return bus 207 is optically connected to a compensating interferometer 200 and then to an optical detector 212 which are substantially identical to the corresponding interferometer 200 and detector 212 of the embodiments of the invention described previously.

Also positioned on optical input bus 102 are a plurality of optical couplers 108a, 108b, 108c, ... 108n. Each of the optical couplers is connected so as to couple optical signals from the input bus 102 to an end of an optical fiber 220a, 220b, 220c, ... 220n. Positioned on optical fibers 220 is an optical coupler 221a, 221b, 221c, ... 221n, coupling light between tee optical fiber 220 and the end of a sensing arm 227a, 227b, 227c, ... 227n of a Michelson interferometer. At least a portion of the sensing arm 227 of each Michelson interferometer is exposed to environmental influences, so as to sense those influences by changing the optical phase of light traveling within the arm 227 in response to environmental influences. The other arm of the Michelson interferometer comprises a continuation of the optical fiber 220, and is illustrated at 225a, 225b, 225c, ... 225n. The other end of each of arms 225 and 227 is terminated by a connection to reflective mirrors 222, which are configured to reflect light received from arms 225 or 227 back into those respective arms.

A portion of the input bus 102 between pairs of couplers 108 may extend to whatever length is necessary in order to position the sensors in their desired sensing locations.

To make the system of FIG. 6 equivalent to the embodiment illustrated in FIG. 4, the length of sensing interferometer arms 225 and 227 should be approximately 1/2 the length of corresponding sensing interferometer arms 115 and 117, respectively, of FIG. 4. In this configuration, the optical signals transmitted into the arms 225 and 227 of the sensing Michelson interferometers and reflected back through those arms will have traveled substantially the equivalent path length as in the corresponding Mach-Zehnder interferometers 109 of FIG.

In operation, the light source 100 and optical gate 101 communicate via lens 103 a pulsed optical signal 201 onto the optical input bus 102. A portion of the optical pulse signal 201 is communicated through coupler 104 on to the free end 235 on return bus 207. The remaining portion of pulse 201 travels down bus 102 and portions of this signal are coupled in each of the couplers 108 onto optical fibers 220 and into the associated Michelson interferometers defined by arms 225 and 227. The signals reflected from those Michelson interferometers are again coupled via couplers 108 onto the input bus 102, with each interferometer producing a pair of optical pulse signals 205a, 205b, 205c, ... 205n for transmission onto input bus 102. The optical signals 205 are coupled in optical coupler 104 onto return bus 207, from whence they pass into the Mach-Zehnder interferometer 200 and are processed in the manner previously described with respect to FIG. 4. As with the system of FIG. 4, the optical signal detected by detector 212 comprises a phase difference signal representative of the environmental parameters influencing the sensing arm 227 of the Michelson interferometer which produced the pair of optical signals 205 currently combined in the output from interferometer 200.

As with the embodiment of the device illustrated in FIG. 4, the embodiment of FIG. 6 permits positioning of the sensing interferometers at any desired location such that spacing between adjacent couplers 108 is sufficiently great so that optical signals 205 coupled onto bus 102 by a given coupler 108 do not overlap or interfere with optical signals coupled onto bus 208 by other optical couplers 108.

The presence of coupler 104 on the input bus 102 comprises one additional coupler which the optical signals must pass through as compared to the embodiment of FIG. 4. Accordingly, the system of FIG. 6 suffers approximately a 6 dB loss in performance as compared to the performance of the embodiment of FIG. 4.

In the embodiments described thus far, the compensating interferometer 200 is optically coupled to the return bus 114. However, the coupling interferometer 200 could also be optically coupled to the input bus 102, between the optical signal source 100 and the first optical coupler on the bus 102. That configuration would produce substantially the same results as the configurations described above.

One example of an embodiment of the device which includes the compensating interferometer 200 positioned on the input bus 102 may be described by reference to FIG. 7. The embodiment of FIG. 7 comprises the embodiment illustrated in FIG. 3, with the compensating interferometer 200 repositioned such that the optical signal communicated through lens 103 is coupled into the input of interferometer 200 at coupler 202. The signal from interferometer 200 is optically coupled in coupler 204 to the optical input bus 102.

Figure 7:
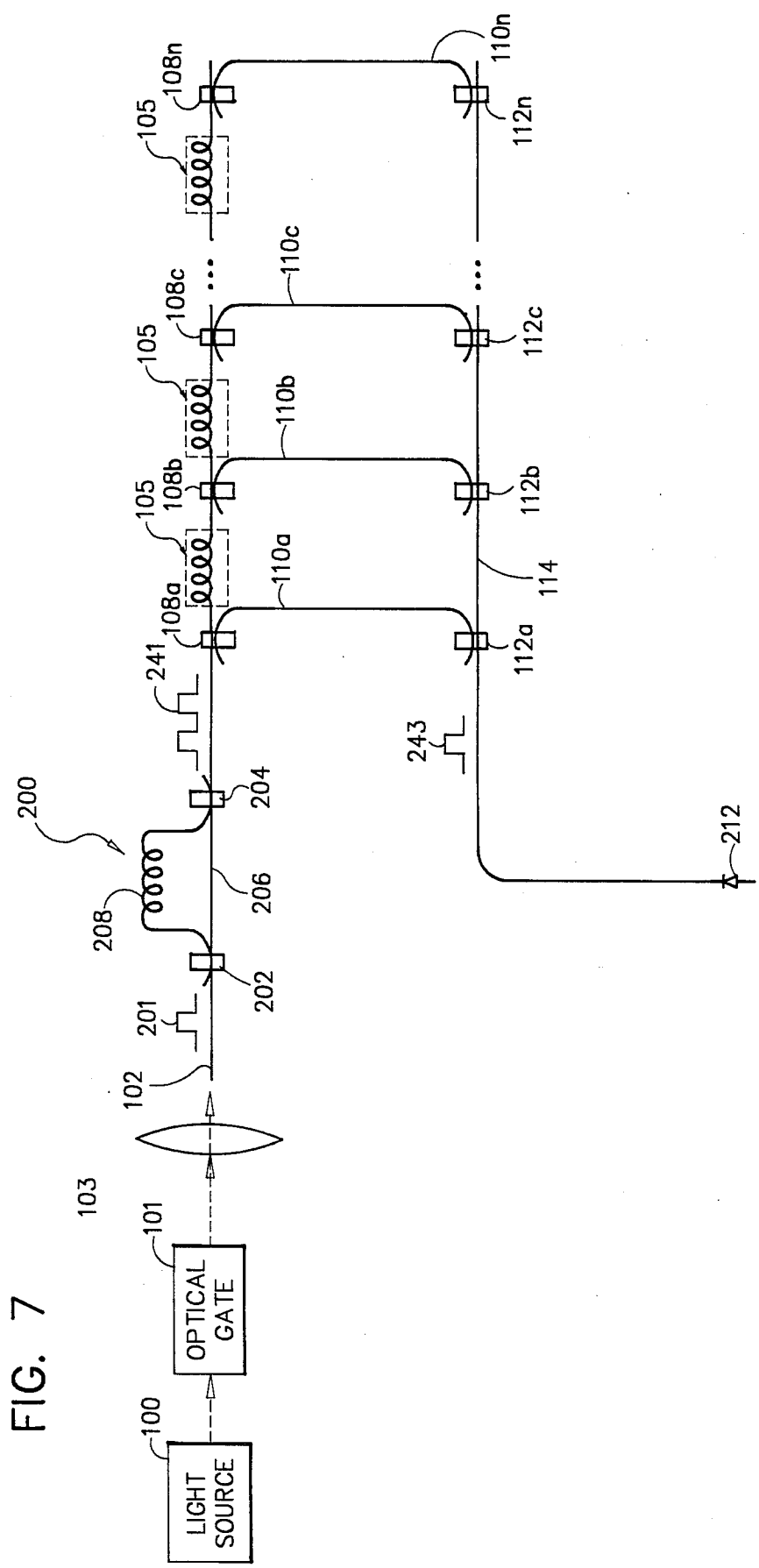
FIG. 7 is a schematic drawing of a further preferred embodiment of the invention, wherein the compensating interferometer is positioned on the input waveguide.

With the compensating interferometer 200 located on the input bus 102 in FIG. 7, the return bus 114 is directly coupled to detector 212. Except for the changes described above, no further modifications of the device as configured in FIG. 3 are included in the embodiment of FIG. 7.

In operation, an optical pulse 201 is communicated from the light source 100 and optionally the optical gate 101 via lens 103 to the input of coupler 202. A portion of optical signal 201 is coupled into arm 208 of interferometer 200, while the remainder of pulse 201 travels through arm 206 of the interferometer. The pulses from arms 208 and 206 are coupled on to input bus 102 in coupler 204. The result of this coupling process is a pair of pulsed optical signals 241 which travel down input bus 102 in the same manner as signal 201 does in the embodiment illustrated in FIG. 3. Specifically, a portion of each of the pair of pulsed optical signals 241 is coupled in each of the optical couplers 108 into each of the arms 110. Since the optical path length traveled by signals which propagate through adjacent arms 110 corresponds to the optical path length difference of interferometer 200, the pair of signals 241 returning on bus 114 from propagation through adjacent arms such as 110a and 110b are combined in their associated common coupler, such as coupler 112a. As a result of this coupling, those portions of the pulsed signals 241 which has traveled the same optical path lengths are coherently coupled to form an output signal 243.

Signal 243 comprises a phase difference signal representing the environmental effects which influenced the phase of the portion of signal 241 propagating through the sensor region 105 of the optical path defined through arm 110. As is the case in the embodiment of FIG. 3, only one of the signals which are coherently coupled to form the phase difference signal 243 have traveled through the sensing region 105. Accordingly, the phase difference value of signal 243 is representative of those environmental effects influencing the sensor region 105.

The phase difference signal 243 is communicated via return bus 114 to detector 212 and processed in the same manner as the phase difference signal generated by coupler 204 in FIG. 3.

The results produced by the embodiment of FIG. 7, with compensating interferometer 200 positioned on the input bus 102 are substantially identical to the results obtained from the embodiment of the system illustrated in FIG. 3, with the sensing interferometer 200 positioned on the output bus 114. Likewise, substantially identical results are obtained from the other embodiments of the invention, when the compensating interferometer 200 is positioned on the input bus 102, rather than on the output bus 114.

In each of the configurations of the present invention, the compensating interferometer 200 is preferably shielded from environmental conditions which may influence the phase of light waves being transmitted therethrough. In addition, such environmental shielding can be used on the non-sensing arms 115 and 225 of the embodiments of FIGS. 4 and 6, respectively, as well as on the non-sensing portions of sensing arms of all of the embodiments particularly when these arms are very long. Use of shielding as described above will increase the sensitivity of the system, althoough such shielding is not required for system operability. No other shielding for this purpose is required in these systems, since the systems are environmentally insensitive except in those portions of a system where signals to be combined in the compensating interferometer are traveling in different paths. This insensitivity is due to the fact that in optical signals in the system which are communicated along a common path, environmental influences affecting the light signals in the common path will not produce any changes in the phase difference between the light signals in those paths. Changes in phase difference will only occur when the light is traveling in different paths, and then only in the sensors and portions of those different paths which are affected by influences such as environmental effects.

Each of the configurations of the invention described herein comprise a representative embodiment of the invention. It will be appreciated that these configurations can be expanded as necessary by adding further couplers and associated sensing sections in the repetitive configurations illustrated.

Based on the above description, it becomes apparent that each of the embodiments of the invention disclosed herein defines a distributed sensor system which is lead insensitive, and therefore requires only a minimum amount of environmental shielding. These configurations also describe an all fiber-optic sensor system which is free from both source phase-induced intensity noise and crosstalk between sensors.

It will be noted that each sensor has a free end from which light may escape. Although this introduces loss, it is not a serious problem since, even for a large number of sensors, power loss can be kept relatively modest by properly selecting the coupling constants of the directional couplers. The method for selecting these coupling constants is explained in detail hereinafter.

Selecting Coupling Coefficients

An issue relevant to the design of a coherence multiplexed distributed sensor system, is the proper selection of coupling coefficients for the various directional couplers used in the system. As used herein, the term "coupling coefficient" is defined as the power ratio of the coupled power to the total output power. For example, referring to FIG. 2, if light is applied to port A, the coupling coefficient would be equal to the ratio of the power at port D to the sum of the output at ports B and D.

The determination of the coupling coefficients may be based in part on the intuitive requirement that all sensors experiencing equal environmental modulation amplitudes should return signals of comparable strength to the central processing location.

Using the embodiment of FIG. 1 as an example, assume that there are N sensors 110. Number the sensors with an index j running from 1 to N, starting with j=1 for the sensor closest to the light source 100 and to the compensating interferometer 200. Let the power coupling coefficient for the couplers 108 and 112 associated with sensor J be $k_j$, so that a fractional portion $k_j$ of the total power is transferred between the two fibers in the coupler, and an amount of power $1-k_j$ passes straight through the coupler, without being coupled. It is noted the couplers at the ends of a given optical fiber sensor should be identical.

It is assumed for simplicity that light must couple across fibers in the couplers 108 in order to get from the input bus 102 to a sensing fiber 110 and back to the return bus 114, although the situation could just as well be reversed. Light returning from sensor j will have suffered loss from couplers 1 through j on both the input bus 102 and the return bus 114. Couplers 1 through j-1 will have a transmission $1-k_q$ for both the input and return couplers 108 and 112, respectively, and the two couplers at sensor j will have a transmission $k_j$. Hence, the power returning from sensor j to the receivers 120 is given by $$P_{j,return} = P_{in}k_j^2 \prod_{q=1}^{j-1} (1 - k_q)^2 \quad (2)$$

where $P_{in}$ is the power being sent to the sensor array. Setting $P_{j+1,return} = P_{j,return}$ it is found that the coupling coefficients are related by $k_{j+1} = k_j/(1-k_j)$, or equivalently, $$k_j = \frac{k_{j+1}}{1 + k_{j+1}} \quad (3)$$

The last sensor does not really require any couplers since no power is needed for the later sensors; hence one can set $k_n = 1$. Together with the recursion relation just derived, this implies that the coupling coefficient for the couplers of sensor j is just $$k_j = \frac{1}{N - j + 1} \quad (4)$$

This, in turn, means that the total transmission $P_{j,return}/P_{in}$ is the same for every sensor, as expected, and is equal to $1/N^2$. The factors of $1/N$ appears because the input power has to be split up among N sensors.

The Pseudo-Heterodyne Technique For Preventing Signal Fading

Signal fading is a significant problem for all Mach-Zehnder type sensors. One solution to this problem is to heterodyne the signals by introducing a frequency shifter into one arm of the receiver, in the manner described previously with respect to the embodiment of FIG. 1.

While conventional heterodyning provides one method for avoiding signal fading and for distinguishing between signals in the desired frequency range and lower frequency environmental effects, this approach has the disadvantage that it requires the use of frequency shifters, which often comprise bulk optics devices. Such devices can be bulky, increase system loss, degrade efficiency, and can be costly.

An easier and less expensive method to avoid signal fading is a pseudo-heterodyne technique which requires no bulk optic devices in the optical path of the sensor system. The technique is defined in connection with its application in a fiber-optic gyroscope in B. Y. Kim and H. J. Shaw, "Phase-Reading All-Fiber-Optic Gyroscope," Optical Letters, Vol. 9, Page 378, (1984). The technique is also disclosed in connection with its application in a fiber-optic gyroscope in co-pending United States patent application Ser. No. 603,630 entitled "Phase Reading Fiber-Optic Rotation Sensor," filed Apr. 25, 1984, and assigned to the assignee of this present application, abandoned in favor of U.S. patent application Ser. No. 946,628, filed on Dec. 29, 1986, also assigned to the assignee of this present application. Both the above referenced paper and patent application are hereby incorporated herein by reference.

The application of the technique to the distributed sensor of the present invention can be described by reference to FIG. 8. The sensing system optically coupled to the modulating system of FIG. 8 an correspond to any of the systems illustrated in FIGS. 1, 3, 4, 5 and 6. This technique also holds for the configuration of FIG. 7, wherein the optical signals are received by detector 212 directly from return bus 114. Thus, only the compensating interferometer which is optically connected to those sensing system is specifically illustrated in FIG. 8.

In particular, a 1 to N switch 300 is optically connected on its input side to the output of detector 212. Switch 300 functions essentially as a multiplexer in response to incoming signals, such that when a new signal is received from detector 212, the switch 300 increments to the next channel location which corresponds with the particular sensor whose environmental information is represented by the signal from detector 212. Thus, if the signal information from detector 212 is representative of the sensor information communicated through a particular arm, such as 110b of FIG. 3, then the switch 300 will output this information on channel 2. Likewise, as the next information is received from detector 212, relating to the signal communicated from arm 110c, the switch 300 will move to the next channel and transmit the information through corresponding channel 3. One preferred embodiment of a 1 to N switch which may be utilized in conjunction with the present invention is a CMOS 40668 FET switch manufactured by National Semiconductor.

Each of the output channels from switch 300 is connected to an identical equipment configuration. Accordingly, the 1 to N switch is optically connected via each of its channels to a low pass AC amplifier 302a, . . . 302n, which itself is connected to a gate circuit 304a, . . . 304n for producing a square wave signal on a periodic basis. The output of gate 304 is electronically connected to a spectrum analyzer 306a, . . . 306n, for use in identifying side bands around a harmonic of a modulation frequency in order to monitor the phase shift in the sensor 105 at a particular frequency. Alternatively, an FM demodulator may be used instead of the spectrum analyzer.

The gates 304 are also connected to a signal generator 308 which produces a sinusoidal signal at a modulation frequency $f_m$. This signal controls periodic production of the square wave in the gate circuit 304. The signal generator 308 is also connected to a phase modulator 310 which is positioned in optical communication with the arm 208 of compensating interferometer 200. The phase modulator 310 is controlled by the signal generator 308 which causes the phase modulator to produce a phase modulation signal at the modulation frequency $f_m$.

Since the equipment connected to each output channel from switch 300 functions in an identical manner, the operation of the equipment on a single channel will be described for example purposes. It is noted that the optical signals in the system of FIG. 8, propagate and interfere in the manner previously described with respect to the embodiment of FIGS. 1, 3, 4, 5 and 6 except as is otherwise indicated below. The description herein also applies to the embodiment of FIG. 7, wherein the phase modulator 310 is positioned on arm 208 of the interferometer 200 or input bus 102. Specifically, the light in arm 208 is phase modulated by the phase modulator 310, which is driven at a modulation frequency corresponding to the operating frequency of generator 308. As a result, the intensity of the output signal from coupler 204 which is received by detector 212 is modulated, and the resulting electrical output signal from detector 212 contains components at the phase modulation frequency $f_m$ and its harmonics, as indicated by the following equation:

$$I(t) = C[1 + \cos(\Delta\phi_m \sin\omega_m t + \Delta\phi_a \sin\omega_a t + \Delta\phi_e)] = \quad (5)$$

$$C\left[1 + \left(J_o(\Delta\phi_m) + 2\sum_{n=1}^{\infty} J_{2n}(\Delta\phi_m)\cos 2n\omega_m t\right)\cos(\Delta\phi_a \sin\omega_a t + \Delta\phi_e) -\right.$$

-continued $$\left\{ 2 \sum_{n=1}^{\infty} J_{2n-1}(\Delta\phi_m) \sin(2n-1)\omega_m t \right\} \sin(\Delta\phi_a \sin\omega_a t + \Delta\phi_e) \right]$$

where
C is a constant;
$J_n$ denotes the nth order Bessel function;
$\Delta\phi_m$ is the amplitude of the phase modulation between the light waves in arms 206 and 208 due to the phase modulator 310;
$\omega_m = 2\pi f_m$;
$\Delta\phi_a$ is the amplitude of the phase difference between the light waves in arms 206 and 208 produced by external acoustic signals;
$\omega_a = 2\pi f_a$; and
$\Delta\phi_e$ is the amplitude of the phase difference between the light waves in the arms 428 and 554 produced by slow changes in the environment.

Equation 5 indicates that the output from detector 212 contains terms including: $\cos(\Delta\phi_a \sin \omega_a t + \Delta\phi_e)$ and $\sin(\Delta\phi_a \sin \omega_a t + \Delta\phi_e)$. However, these cosine and sine elements are at different frequencies. If these signals were at the same frequency, with their phases in quadrature, well-known trigonometric rules could be applied so that the signals could be added directly to obtain a single, low frequency, sinusoidal signal whose phase corresponds to ($\not\equiv\phi_a \sin\omega_a t + \Delta\phi_e$). Such a relationship can be achieved in the system of FIG. 8 through use of amplitude modulation. Amplitude modulation simply involves making the amplitude of the electrical output signal from detector 212 vary in accordance with the amplitude of a modulating signal.

When the output signal from detector 212 is amplitude modulated by a modulating signal having a frequency which is an odd multiple of the phase modulation frequency ($f_m$) (which is also the difference frequency between adjacent harmonics), then each component of the output signal from detector 212 which is a harmonic of $f_m$ becomes partially translated into the frequencies of its harmonic neighbors. In other words, through amplitude modulation in this manner, sideband frequencies are created at harmonics of the phase modulation frequency. The sideband frequencies are combined with the component of the output signal at the corresponding frequency, and are readily identified by use of a spectrum analyzer.

These and other characteristics of amplitude modulation are generally known to those skilled in the art and are described in detail in F. G. Stremler, *Introduction to Communication Systems*, Addison-Wesley, (1979), which is incorporated herein by reference. Subject matter of particular relevance at this point is set forth on pages 191-260 of the Stremler text.

Based on the above, it will be appreciated that a sinusoidal amplitude modulation at a frequency $f_m$ will transfer energy out of each harmonic frequency component and into the nearest harmonic frequency neighbors. To prevent interference in the present sensors system, it is desirable that $f_m$ be much greater than $f_a$ (the frequency of acoustic signals which are being detected).

In operation, the optical signal in arm 208 of compensating interferometer 200 is phase modulated at a frequency which is controlled by frequency generator 308. As indicated above, the frequency of generator 308 is selected so that $f_m$ (the modulation frequency) is much greater than the acoustical frequency ($f_a$). The signal from arm 208 passes through coupler 204 where it is mixed with the signal from arm 206, producing an intensity modulated signal due to the phase difference which is passed to detector 212. From detector 212, the intensity modulated signal due to the phase difference is communicated through the 1 to N switch to amplifier 302 where the signal is amplified and then transmitted to the conventional electronic gate 304.

Gate 304 functions in response to a signal received from the frequency generator 308, causing gate 304 to produce a square wave amplitude modulation of the signal received from amplifier 302. When modulated at the appropriate phase with respect to the AC detector current, and with the appropriate choice of $\Delta\phi_m$, the amplitude modulated signal of this embodiment may be defined as $\cos[n\omega_m t - (\Delta\phi_a \sin\omega_a t + \Delta\phi_e)]$.

With respect to the appropriate phase and amplitude for modulation, it is noted that due to the trigonometric relationships between the waveforms in coupler 204, amplitude modulation at even harmonics of $f_m$ would not produce coupling between adjacent harmonic frequencies. Rather, amplitude modulation at even harmonics of $f_m$ would result in the even harmonics coupling with even harmonics, and odd harmonics coupling with odd harmonics. This situation is generally understood by those skilled in the art, and the basis for this condition may be more fully understood with reference to the Stremler text which has been incorporated herein. These problems are avoided if amplitude modulation at the odd harmonics is utilized.

The output from gate 304 is communicated to the spectrum analyzer 306 for processing. It is noted that spectrum analyzers 306 incorporate a band pass filter for selecting and analyzing particular components of signals. If such a band pass filter, centered on $2\omega_m$, were placed on the output of the gate, and if the amplitude of the phase modulation $\Delta\phi_m$ were chosen appropriately, the filter would pass a signal of the form:

$$V(t) = k \times \{J_0(\Delta\phi_a)\cos(2\omega_m t - \Delta\phi_e) + \quad (6)$$

$$\sum_{n=1}^{\infty} J_{2n}(\Delta\phi_a)[\cos(2(\omega_m - n\omega_a)t - \Delta\phi_e) + \cos(2(\omega_m + n\omega_a)t - \Delta\phi_e)] +$$

$$\sum_{n=1}^{\infty} J_{2n-1}(\Delta\phi_a)[\cos((2\omega_m - (2n-1)\omega_a)t - \Delta\phi_e) - \cos((2\omega_m + (2n-1)\omega_a)t - \Delta\phi_e)]\}$$

where k is a constant which does not influence the identification and evaluation of phase shifts occurring in the sensor at particular frequencies.

By putting the demodulated signal from the gate 304 into the spectrum analyzer 306, the height of the Bessel function sidebands around the second harmonic of the modulation frequency can be measured by use of techniques which are well-known in the technology to give the phase shift in the sensor at a particular frequency. Alternatively, for a complicated signal, an FM demodulator could be used. In that case, the measured signal would be the derivative of the phase rather than the actual phase, or alternatively, an integrator could be used to produce a measured signal representative of the actual phase.

Figure 8:
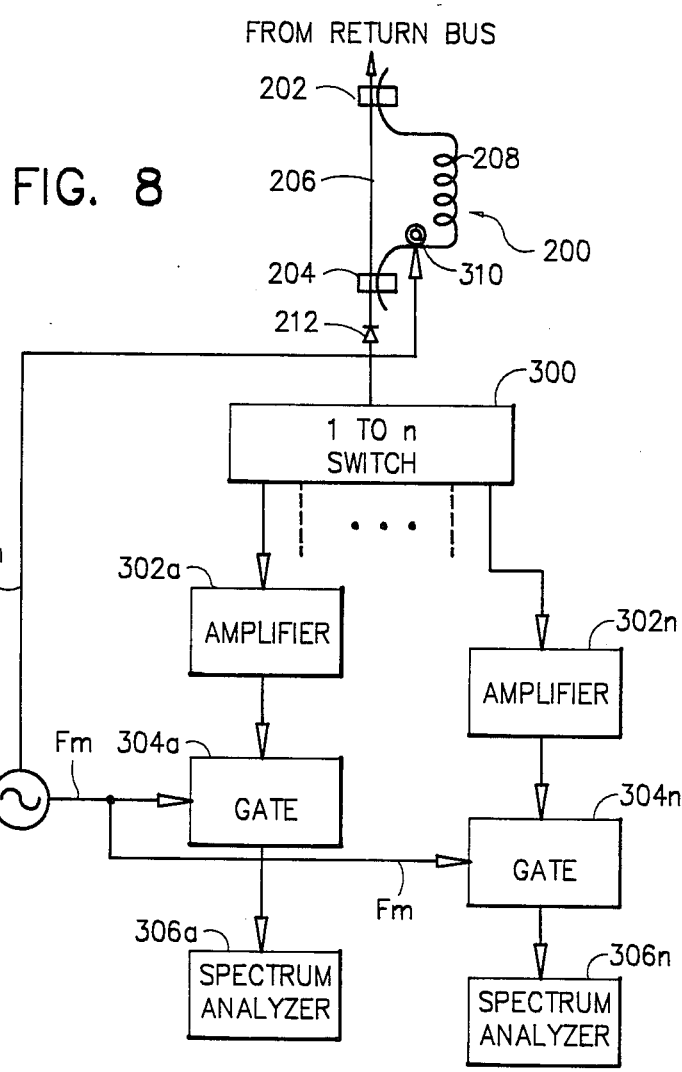
FIG. 8 is a schematic drawing of one embodiment of the distributed sensor system, illustrating a technique for frequency shifting the output signal from distributed sensors using phase modulators and gates.

Optionally, gating of the system of FIG. 8 could be accomplished optically rather than electrically by utilizing at least one optical gate, such as a shutter, positioned between coupler 204 and detector 212, or on any fiber in the system comprising an optical path where all light signals travel, such as input bus 102 between the light source 100 and optical coupler 108a, of FIGS. 1, 3, 4, 5 or 6, or optical fiber return bus 114 between couplers 112a and 202 of the embodiments of those figures. If the gate 304 were positioned distant from the detector 212, the gate should be controlled by a delay signal at a frequency $f_m$ so that the light traveling within the system would be amplitude modulated at the $f_m$ frequency, in appropriate phase with the distant gate. In all other respects, the use of optical gating would provide a result substantially identical to that described in connection with electrical gating.

Figures 9, 11:
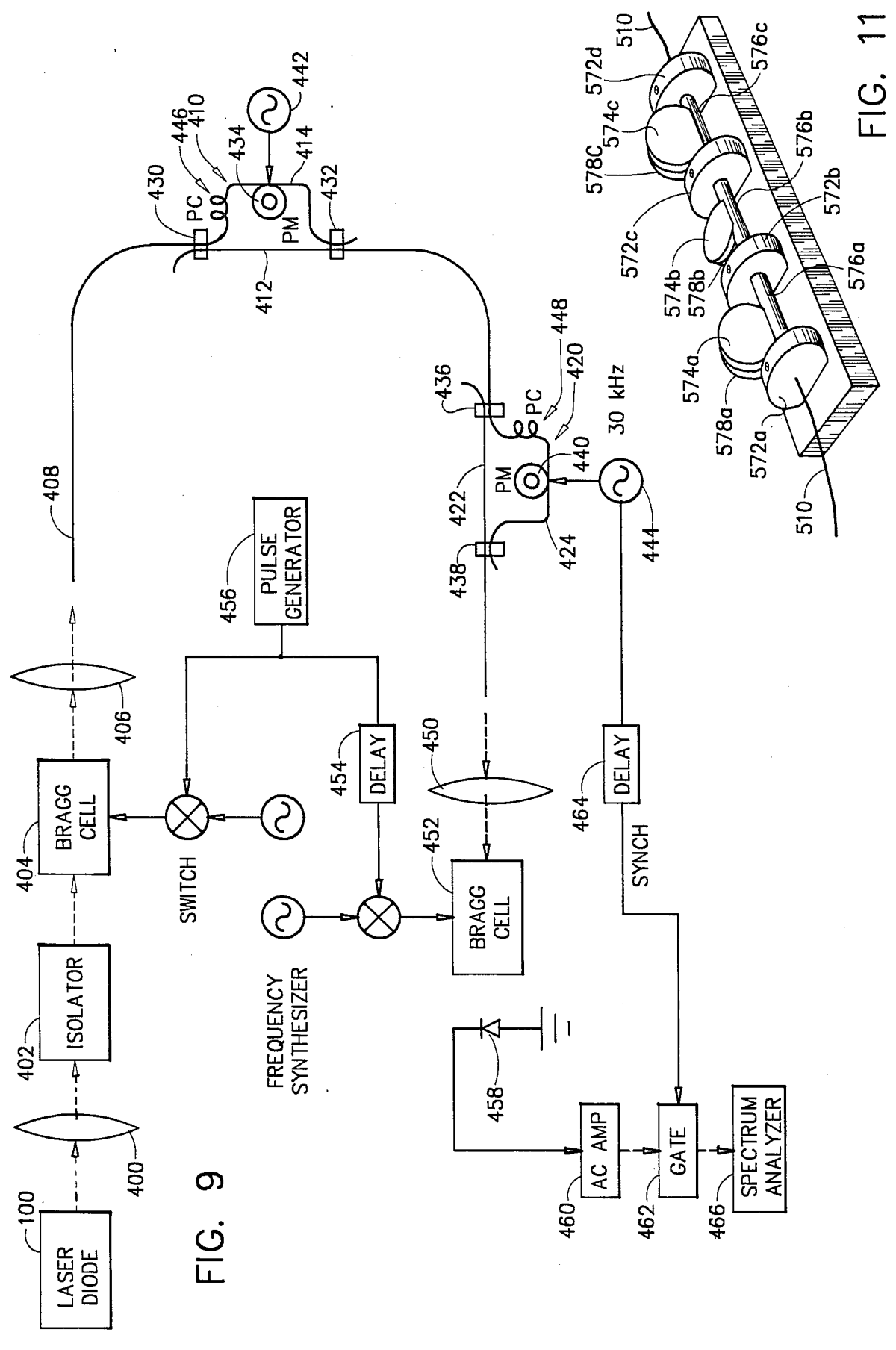

A simplified version of the embodiment of FIG. 3, including the synthetic heterodyning configuration of FIG. 8 was constructed and tested to evaluate its performance. The organization of this simplified version may be described along with the results of the evaluation, by reference to FIG. 9. In the embodiment of FIG. 9, the light source 100 comprised an essentially single-mode laser diode comprising a Hitachi HLP 1400 emitting a continuous wave 820 nm light. This light was communicated through a lens 400 and a conventional optical isolator 402 to an aousto-optic Bragg cell 404 corresponding to optical gate 101 of FIG. 3, with a 35 nsec rise time. The Bragg sell 404 was used, instead of direct modulation of the input current to the laser, in order to avoid modulation of the laser spectrum.

The 100 nsec wide pulses were communicated through a lens 406 to the end of an optical input bus 408, corresponding to bus 102 of FIG. 3.

The optical pulses were transmitted through a first fiber-optic Mach-Zehnder interferometer 410 having a first arm 412 corresponding to arm 110a of FIG. 3. Likewise, the arm 414 of interferometer 410 corresponds to the optical path length defined between coupler 108a and 112a, for the signal passing through arm 110b of the embodiment of FIG. 3. Interferometer 410 additionally included a phase modulator 434 in optical contact with the arm 414 of that interferometer. Phase modulator 434 was provided to simulate an acoustic signal. A signal generator for producing the phase modulation in modulator 434 is illustrated at 442. The phase modulator 434, as well as all other phase modulators in the system correspond to the type described previously herein.

Interferometer 410 also included polarization controllers generally indicated at 446. These manually adjustable polarization controllers were used to overcome polarization induced signal-fading for the associated sensor. The polarization controllers correspond to those which will be described hereafter. Optionally, polarization preserving or polarizing fiber can be used to form the optical fiber waveguides in the system, removing the need for polarization controllers 446.

Optical couplers 430 and 432 were positioned on the input bus 408 to couple optical signals between that input bus and the arms of the interferometer 410. Couplers 430 and 432, as well as all other couplers in the system, comprised tunable directional couplers of the type described previously herein.

From the output of interferometer 410 the optical signals were communicated to another interferometer 420 which corrresponds to the interferometer 200 of FIG. 8. Particularly, arm 422 of FIG. 9 corresponds to arm 206 of the interferometer 200 of FIG. 8. Likewise, arm 424 of interferometer 420 of FIG. 9 corresponds to arm 208 of the interferometer 200 of FIG. 8. The optical interferometer 420 comprised optical couplers 436 and 438 for coupling optical signals received from interferometer 410 between arms 422 and 424 of the interferometer 420. In addition, a phase modulator 440 was positioned in optical contact to the arm 424 of the interferometer 420. The phase modulator 440 was used to generate relatively high frequency modulation at the rate of approximately 30 kHz for the synthetic-heterodyne demodulation technique employed avoid signal-fading caused by phase drive.

The optic path difference between the arms in interferometer 410 corresponds to the optical path difference between the arms of the interferometer 420. In the experimental case, this relative optical path length time delay between the arms in each interferometer was approximately 230 ns.

Matching of the path imbalances of the two interferometers is important. To insure that phaseinduced intensity noise does not arise to a measurable level on the signal pulse, it is necessary to match the optical path length difference of the sensing interferometer 410 and of the compensating interferometer 420 to each other so that the amount of mismatch is less than a small fraction of the coherence length of the light source 100. The accuracy with which fiber lengths can be matched constitutes a practical limit to the coherence length of the optical source which may be used in these distributed sensor arrays. Measurement of the path differences in the evaluation system of FIG. 9 was accomplished by amplitude modulating a laser diode and determining the characteristic frequency of the filtering of each Mach-0Zehnder individually.

In order to equalize the path differences, a technique for taking small lengths of fiber from one arm of an interferometer was required. This was accomplished by using capillary tubes to hold the fibers for splicing, and then grinding down and resplicing the capillary tubes containing the fibers when adjustment of the length was required. The capillary tubes were polished at an angle to minimize reflection back into the laser, which would affect the laser spectrum. The isolator 402 was placed between the laser and the Bragg cell to further decrease reflections. A optical fibers in the system comprise Corning single-mode sensor (high N.A.) fiber. The signal generator for producing the modulation in phase modulator 440 is illustrated at 444. Interferometer 420 also included manually adjustable polarization controllers generally indicated at 448, for overcoming polarization induced signal fading for the associated sensor.

The output from interferometer 420 was communicated via a lens 450 to a Bragg cell 452 which was provided to optically sample signal pulses from the series of output pulses received from interferometer 420. This Bragg cell 452 was connected via a delay line 454 to a pulse generator 456. Pulse generator 456 was also connected to Bragg cell 404. Thus, the pulse generator 456 functioned to cause operation of both Bragg cell 404 and 452. The Bragg cell 452 was pulsed synchronously with Bragg cell 404 in order to extract only the signal pulse.

The signal current received through lens 450 in Bragg cell 452 was communicated to a detector 458 corresponding to detector 212 of FIG. 8. The signal current from detector 458 was transmitted through a narrow band width (about 300 kHz) AC amplifier 450 corresponding to amplifier 302 of FIG. 8, and into an electronic gate 462 corresponding to gate 304 of FIG. 8. The gate 462 was connected via delay line 464 to the signal generator 444, to synchronize the gate 462 to the phase modulation signal from generator 444. The output of the gate 462 was provided to a spectrum analyzer 466 corresponding to spectrum analyzer 306 of FIG. 8.

With the amplitude of the phase modulation for the synthetic heterodyne demodulation adjusted to be about 2.8 radians, the phase of the second harmonic signal received in the spectrum analyzer 466 from gate 462 reflected the optical phase difference between the interfering optical waves. The magnitude of this signal is independent of the optical phase difference, leading to a constant sensitivity.

The minimum detectable phase shift in the sensor was ascertained by measuring the signal-to-noise ratio displayed on the spectrum analyzer for a small known phase modulation amplitude from the sensor. To calibrate the phase modulation amplitude induced by phase modulator 434 on the optical signal, the voltage corresponding to 3.83 radians was measured at each signal frequency. Voltage at this level nulled the first Bessel function side band. The sensor sensitivity was measured with the repetition rate of the optical input pulses set at 1.46 MHz, corresponding to 3 times the optical path length difference in the interferometers 410 and 420. In this condition, no pulse was generated which contained phaseinduced intensity noise. With the repetition rate of the optical input pulses set at 2.18 MHz, corresponding to 2 times the optical path length difference of the interferometers 410 and 420, the non-signal bearing pulses, emitted at different times from the source, overlapped and generated phase-induced intensity noise in the pulses which were discarded.

In both sets of measurements, the sensitvity of the system was below 40 $\mu$rad/$\sqrt{Hz}$ over a broad range of frequencies. The results of the first set of measurements are plotted as O's in FIG. 9. Likewise, results of the second set of measurements are plotted using the symbol X in FIG. 9.

The fact that there was no significant difference in the sensitivity of the system in the two cases demonstratees that the signal pulse is well separated from the pulse which contains phase-induced intensity noise. The sensitivity was found to be limited by the electronic noise in the signal processing electronics 460 and 462.

In another set of measurements, an electronic switch was substituted for the second Bragg cell 452. Sensitivity was again measured in this configuration, with the results indicated as $\Delta$'s in FIG. 9. These results indicate that there was no significant difference in the sensitivity resulting from the two types of gating.

The Polarization Controllers 446, 448

Figure 10:
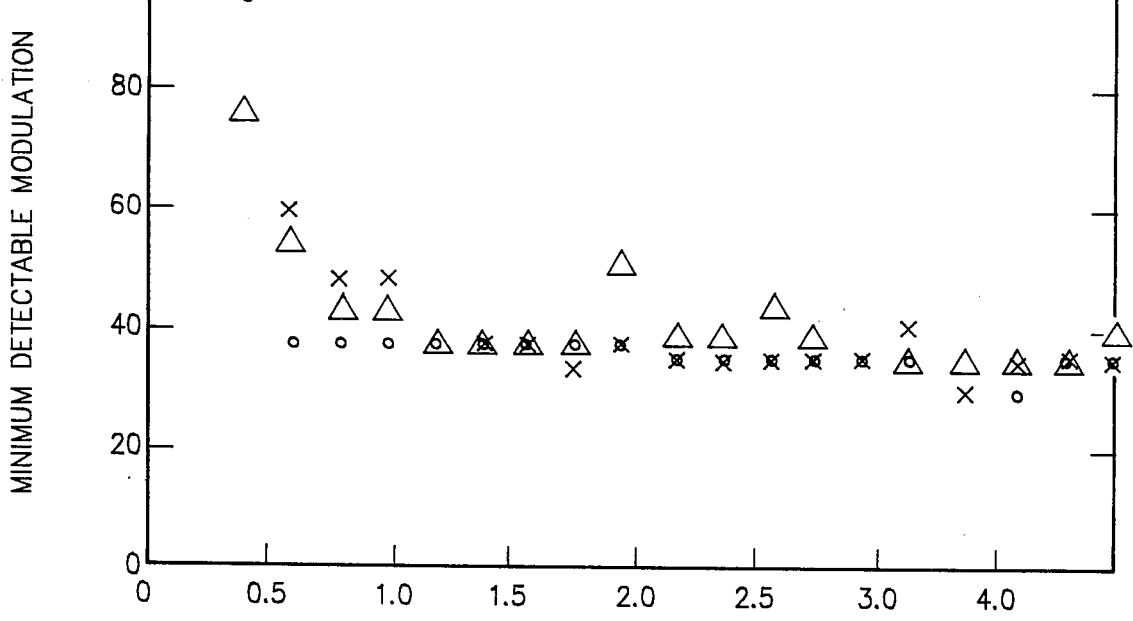
FIG. 10 is a graphical presentation of minimum detectable modulation as a function of signal frequency, illustrating results of system sensitivity evaluations for input optical signals at selected pulse frequencies and with optical and electronic switches.

One type of polarization controller suitable for use in the sensor system of the present invention, such as the embodiment of FIG. 8, is illustrated in FIG. 10. The controller includes a base 570 on which a plurality of upright blocks 572a through 572d are mounted. Between adjacent ones of the blocks 572, spools 574a through 574c are tangentially mounted on shafts 576a through 576c, respectively. The shafts 576 are axially aligned with each other and are rotatably mounted between the blocks 572. The spools 574 are generally cylindrical and are positioned tangentially to the shafts 576.

A segment of optical fiber 510 extends through axial bores in the shafts 576 and is wrapped about each of the spools 574 to form three coils 578a through 578c. The radii of the coils 578 are such that the fiber 510 is stressed to form a birefringent medium in each of the coils 578. The three coils 578a through 578c may be rotated independently of each other about the axis of the shafts 574a through 574c, respectively, to adjust the birefringence of the fiber 510 and, thus to control the polarization of the light passing through the fiber 510.

The diameter and number of turns in the coils 578 are such that the outer coils 578a and 578c provide a spatial delay of one-quarter wavelength, while the central coil 578d provides a spatial delay of one-half wavelength. The quarter wavelength coils 578a and 578c control the elipticity of the polarization, and the half wavelength coil 578d controls the direction of polarization. This provides a full range of adjustment of the polarization of the light propagating through the fiber 510.

It will be understood, however, that the polarization controller may be modified to provide only the two quarter wave coils 578a and 578c, since the direction of polarization (otherwise provided by the central coil 578b) may be controlled indirectly through proper adjustment of the elipticity of polarization by means of the two quarter wave coils 578a and 578c. Accordingly, the polarization controllers 551 and 557 are shown in FIG. 10 as including only the two quarter wave coils 578a and 578c. Since this configuration reduces the overall size of the controllers 551 and 557, it may be advantageous for certain applications of the present invention involving space limitations.

Thus, the polarization controllers 551 and 557 provide means for establishing, maintaining and controlling the polarization of the light within arms of the interferometers, such as arms 117 of interferometers 109 of FIG. 4, and arm 208 of the compensating interferometer 200.

Summary

In summary, not only does the invention described herein comprise a significant improvement over the prior art in monitoring environmental conditions at a plurality of locations by use of an optical source which optionally has a short coherence length, but it also overcomes other long-existent problems in the industry by (1) providing a system of all-passive remote sensors permitting high duty cycle time-domain addressing while not requiring highly coherent light sources; (2) providing distributed sensor array systems which are free from signal fading, source phase-induced intensity noise, crosstalk between sensors, and downlead sensitivity; (3) providing such systems which permit accurate sensing at remote location without environmental shielding of the leads; (4) providing for heterodyning of optical signals in a straightforward, economic, and optionally all-fiber-optic manner which produces accurate and easily analyzed information signals for identifying environmental influences affecting the sensors; and (5) providing the option of all-fiber-optic sensor array systems, which do not require the use of bulk optics or of electronic equipment at the sensor sites.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for remotely sensing environmental effects comprising:
    a source of pulsed optical signals;
    a first optical waveguide optically coupled to the signal source;
    an environmentally sensitive waveguide segment optically coupled to the first optical waveguide,
    said sensitive segment influencing optical signals propagating within said sensitive segment in response to particular environmental conditions;
    a second optical waveguide optically coupled to the first optical waveguide in a configuration such that the second optical waveguide and the
    environmentally sensitive waveguide segment form at least portions of arms of a first unbalanced interferometer; and
    a second unbalanced interferometer optically coupled to the first unbalanced interferometer for receiving optical signals from said first interferometer, wherein the second interferometer provides a pair of optical paths having an optical path length difference which substantially matches an optical path length difference defined by the first interferometer, such that the second interferometer combines optical signals received from the first interferometer to form a phase difference output signal representative of environmental influence on the environmetally sensitive waveguide segment.

2. An apparatus for remotely sensing environmental effects as defined in claim 1, wherein the environmentally sensitive waveguide segment comprises a portion of the first optical waveguide.

3. An apparatus for remotely sensing environmental effects as defined in claim 2, wherein the first interferometer comprises a third optical waveguide optically coupled to the first waveguide at a location such that the environmentally sensitive waveguide is located between the coupling locations of the second and third waveguides.

4. An apparatus for remotely sensing environmental effects as defined in claim 3, further comprising a fourth optical waveguide optically coupled to extend between ends of the second and third waveguides which are opposite from the ends coupled to the first waveguide, and wherein the first interferometer defines a first optical path through the second waveguide, and a second optical path through the environmentally sensitive waveguide segment, and the third and fourth waveguides.

5. An apparatus for remotely sensing environmental effects as defined in claim 4, wherein the optical signals combined in the second interferometer include only one optical signal which propagated through the environmentally sensitive waveguide segment, thereby making the phase difference output signal directly representative of environmental conditions influencing said optical signal as it propagated through said environmentally sensitive waveguide segment.

6. An apparatus for remotely sensing environmental effects as defined in claim 1, wherein the source of pulsed optical signals comprises a short coherence length light source.

7. An apparatus for remotely sensing environmental effects comprising:
    a source of pulsed optical signals;
    means defining a first optical path of a first length for carrying a portion of a pulsed optical signal;
    means defining a second optical path of a second length which is different than the first length for carrying another portion of said pulsed optical signal;
    means defining a third optical path for carrying optical signals received from the first and second paths;
    means defining a fourth optical path for carrying optical signals received from the third optical path;
    means defining a fifth optical path of a length differing from a length of the fourth optical path in an amount substantially equal to the difference between said first and second lengths for carrying optical signals received from the third optical path;
    wherein at least a portion of at least one of the means defining the first, second, fourth and fifth optical paths comprises a selected sensing region which is sensitive to an environmental effect and influences optical signals propagating in said sensing region in response to said environmental effect; and
    means for combining and interfering coherent components of a pair of optical signals, one of said pair of optical signals being from the fourth optical path and the other of said pair of optical signals being from the fifth optical path, wherein only one of said pair of optical signals has propagated through said selected sensing region, thereby providing an output signal representative of the environmental effect which influenced said one of said pair of optical signals that propagated through the selected sensing region.

8. An apparatus for remotely sensing environmental effects as defined in claim 7, wherein the source of pulsed optical signals comprises a short coherence length light source.

9. An apparatus for remotely sensing environmental effects as defined in claim 7, further comprising means for controlling the source of pulsed optical signals so that optical signals received on the third optical path from a first optical pulse from said signal source do not interfere with optical signals received on the third optical path from a second optical pulse from said signal source.

10. An apparatus for remotely sensing environmental effects as defined in claim 9, further comprising means for synchronizing production of said pulsed optical signals so that a last signal reaching the fourth and fifth optical paths from a first pulsed optical signal is spaced from a first signal reaching the fourth and fifth optical paths from a second pulsed optical signal by an amount permitting said last and first signals to be combined in said combining means to obtain a phase difference output signal between those signals and to provide for a substantially continuous duty cycle in apparatus operation.

11. An apparatus for remotely sensing environmental effects as defined in claim 7, wherein the means defining first and second optical paths comprise arms of an interferometer which receives a signal optical pulse signal from the signal source, and which provides a corresponding pair of optical signals to the third optical path;

wherein the means defining fourth and fifth optical paths comprise arms of another interferometer, with a portion of one of said arms comprising the sensing region; and wherein the combining means comprises an optical coupler joining an output end of each of the arms of said another interferometer to provide a coupled, pulsed output signal comprising the combination of said coherent components of said pair of optical signals from said fourth and fifth optical paths and representing environmental effects which influenced said one of said pair of optical signals that propagated through the selected sensing region.

12. An apparatus for remotely sensing environmental conditions as defined in claim 7, further comprising:

a detector optically coupled to the second interferometer for forming an output which corresponds to the phase difference of the combined coherent components of said pair of optical signals from said fourth and fifth optical paths; and a circuit for amplitude modulating the output to produce a first signal having selected harmonics which contain both sine and cosine components of the output, thereby providing for analysis of the output signal to identify environment effects influencing the first and second light paths.

13. An apparatus for remotely sensing environmental conditions as defined in claim 12 further comprising:

a signal generator for providing a phase modulation signal at a selected modulation frequency; a phase modulator, responsive to the signal generator for phase modulating the light waves in one of the first, second, fourth and fifth optical paths at the selected modulation frequency; and wherein the circuit functions to amplitude modulate the output at the selected modulation frequency.

14. An apparatus for remotely sensing environmental effects comprising:

a source of pulsed optical signals;

a first optical waveguide optically coupled to the signal source, with at least one portion of the first optical waveguide comprising a sensing region which is sensitive to an environmental effect and which influences optical signals propagating in said sensing region in response to said environmental effect;

a second optical waveguide optically coupled at one end to the first optical waveguide;

a third optical waveguide optically coupled at one end to the first optical waveguide at a location on the first optical waveguide separated from the coupling location of the second optical waveguide by the sensing region;

a fourth optical waveguide optically coupled to other ends of said second and third optical waveguides, such that the first, second, third and fourth waveguides define a first optical interferometer forming a first optical signal path carrying a portion of a pulsed optical signal from the first waveguide through said second waveguide to the fourth waveguide and a second optical signal path carrying another portion of said pulsed optical signal through the sensing region and the third waveguide to the fourth waveguide; and a second optical interferometer optically coupled to receive the pulsed optical signals from the fourth waveguide, wherein the second optical interferometer includes waveguides defining third and fourth optical signal paths for carrying portions of each of said pulsed optical signals, and wherein the third and fourth optical signal path length difference is substantially equal to the first and second optical signal path length difference so that pulsed optical signals in the second interferometer which have traveled substantially identical path lengths are coupled and interfere to provide an optical output signal representative of the environmental effects which influenced the optical signal that propagated through the sensing region.

15. An apparatus for remotely sensing environmental effects as defined in claim 14, wherein the optical output signal comprises the phase difference of the coupled interfering pulsed optical signals, said phase difference representative of environmental effects influencing that optical signal which propagated through the sensing region.

16. An apparatus for remotely sensing environmental effects as defined in claim 14, further comprising:

a plurality of sensing regions located in spaced relation in the first optical waveguide, each of said sensing regions being sensitive to an environmental effect so as to influence optical signals propagating in said sensing region in response to said environmental effect;

a plurality of optical waveguide segments, with each said optical waveguide segment coupled at one end to the first optical waveguide at locations separated by at least one sensing region from other optical waveguide segments, and with each said optical waveguide coupled at its other end to the fourth optical waveguide, whereby each adjacent pair of optical waveguide segments respectively comprise at least a portion of a pair of arms of an unbalanced optical interferometer defining an optical path length difference which substantially matches the path length difference of the first and second optical signal paths so that optical signals from each of the unbalanced optical interferometers are combined, at different times for each interferometer, in the second optical interferometer to form phase difference signals representative of environmental influence on the sensing region of the corresponding unbalanced interferometer.

17. An apparatus for remotely sensing environmental conditions as defined in claim 14, further comprising:

a detector optically coupled to the second interferometer, said detector forming an output which corresponds to the phase difference of the coupled interfering pulsed optical signals; and a circuit for amplitude modulating the output to produce a first signal having selected harmonics which contain both sine and cosine components of the output, thereby providing for analysis of the output signal to indentify environmental effects influencing the first and second optical signal paths.

18. An apparatus for remotely sensing environmental conditions as defined in claim 17 further comprising:

a signal generator for providing a phase modulation signal at a selected modulation frequency; a phase modulator, responsive to the signal generator for phase modulating the light waves in the second interferometer at the selected modulation frequency; and wherein the circuit functions to amplitude modulate the output at the selected modulation frequency.

19. An apparatus for remotely sensing environmental effects as defined in claim 14, wherein the source of pulsed optical signals comprises a short coherence length light source.

20. A distributed sensor system comprising:

a source of pulsed optical signals; a plurality of fiber-optic sensing interferometers, each sensing interferometer defining a pair of optical paths, and at least a portion of each said interferometer having light transmission characteristics which vary in response to environmental conditions, which each said sensing interferometer having input and output terminals which are optically coupled together to form a ladder network, said input terminals being opically coupled to the light source; and at least one fiber-optic compensating interferometer optically coupled to the output terminals of the sensing interferometers and defining a pair of optical paths whose optical path length difference substantially matches an optical path length difference of the pair of optical paths in a selected sensing interferometer, such that portions of a pulsed optical signal transmitted from the optical signal source through the sensor system will couple and interfere at an output of the compensating interferometer to provide an optical signal representative of conditions causing change in light transmission characteristics of said selected sensing interferometer.

21. A distributed sensor system as defined in claim 20, wherein the light source comprises an optical source having a short coherence length.

22. A distributed sensor system as defined in claim 20, wherein the path length difference between the pair of optical paths in each sensing interferometer substantially equals the optical path length difference between the pair of optical paths in the compensating interferometer.

23. An apparatus for remotely sensing environmental effects comprising:

a source of pulsed optical signals; a first optical waveguide optically coupled to the signal source, with at least one portion of the optical waveguide comprising a sensing region which is sensitive to an environmental effect and which influences optical signals propagating in said sensing region in response to said environmental effect;

second and third optical waveguides optically coupled at one end on either side of the sensing region to the first optical waveguide;

means optically coupled to the other ends of each of said second and third optical waveguides for reflecting optical signals from said second and third waveguide back into said second and third waveguide, such that the first, second and third waveguides and reflecting means define a first optical interferometer forming a first optical signal path carrying a portion of a pulsed optical signal from the first optical waveguide into the second optical waveguide until reflected back into the first waveguide, and forming a second optical signal path carrying a portion of said pulsed optical signal through the sensing region and into the third waveguide until reflected back through the sensing region into the first waveguide; and a second optical interferometer optically coupled to receive the reflected pulsed optical signals from the first waveguide, wherein the second optical interferometer includes waveguides defining third and fourth optical signal paths for carrying portions of each of said reflected, pulsed optical signals, and wherein the third and fourth optical signal paths are substantially equal in length, respectively, to the first and second optical signal paths so that pulsed optical signals in the second interferometer which have traveled substantially equal path lengths are coupled and interfere to provide an optical output signal representative of the environmental effects which influenced the optical signal that propagated through the sensing region.

24. A distributed sensor system as defined in claim 23 wherein the first interferometer is configured to define a Michelson interferometer and the second interferometer is configured to define a Mach-Zehnder interferometer.

25. An appartus for remotely sensing environmental effects as defined in claim 23 wherein the source of pulsed optical signals comprise a short coherence length light source.

26. A distributed sensor system comprising:

a source of pulsed optical signals; a first optical waveguide optically coupled to the pulsed optical signal source;

at least one Michelson interferometer defining first and second optical paths and optically coupled to the first optical waveguide to receive at least a portion of a pulsed optical signal and to return a corresponding pair of pulsed optical signals to the first optical waveguide; and another optical interferometer optically coupled to receive said pair of pulsed optical signals from the first waveguide, wherein said another interferometer includes waveguides defining third and fourth optical signal paths for carrying portions of said pair of optical signals, and wherein the third and fourth signal paths are substantially equal in length, respectively, to the first and second optical signal paths so that pulsed optical signals in said another interferometer which have traveled substantially equal path lengths are coupled and interfere to provide an optical output signal representative of the environmental effects which influenced the optical signal that propagated through the sensing region.

27. A distributed sensor system as defined in claim 26 wherein said another interferometer comprises a Mach-Zehnder interferometer.

28. An apparatus for remotely sensing environmental effects as defined in claim 26 wherein the source of pulsed optical signals comprise a short coherence length light source.

* * * * *